US007860882B2

(12) United States Patent
Hinton et al.

(10) Patent No.: US 7,860,882 B2
(45) Date of Patent: *Dec. 28, 2010

(54) METHOD AND SYSTEM FOR DISTRIBUTED RETRIEVAL OF DATA OBJECTS USING TAGGED ARTIFACTS WITHIN FEDERATED PROTOCOL OPERATIONS

(75) Inventors: Heather M. Hinton, Austin, TX (US); Matthew P. Duggan, Austin, TX (US); Patrick R. Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

This patent is subject to a terminal disclaimer.

(21) Appl. No.: 11/456,193

(22) Filed: Jul. 8, 2006

(65) Prior Publication Data

US 2008/0010287 A1  Jan. 10, 2008

(51) Int. Cl.
G06F 17/30 (2006.01)
G06F 7/04 (2006.01)
(52) U.S. Cl. .......................... 707/769; 726/9
(58) Field of Classification Search ................. None
See application file for complete search history.

(56) References Cited

U.S. PATENT DOCUMENTS

| | | | | |
|---|---|---|---|---|
| 2002/0173984 | A1* | 11/2002 | Robertson et al. | 705/1 |
| 2004/0230831 | A1* | 11/2004 | Spelman et al. | 713/201 |
| 2005/0223413 | A1* | 10/2005 | Duggan et al. | 726/3 |
| 2005/0235011 | A1* | 10/2005 | Minium et al. | 707/203 |
| 2005/0240621 | A1* | 10/2005 | Robertson et al. | 707/102 |
| 2006/0059024 | A1* | 3/2006 | Bailey et al. | 705/5 |
| 2006/0074876 | A1* | 4/2006 | Kakivaya et al. | 707/3 |
| 2006/0088039 | A1* | 4/2006 | Kakivaya et al. | 370/400 |
| 2009/0037736 | A1* | 2/2009 | Djordjrvic et al. | 713/170 |

OTHER PUBLICATIONS

Authors: Janis Putman and Stephen Strong, Title:"A Federated Virtual Enterprise (VE) of Partners Creating a Federeated VE of Sytems", Date:1998, pp. 540-545.*
IBM Zurich Research Laboratory, "Security Analysis of the SAML Single Sign-on Browser/Artifact Profile", Sep. 21, 2003. pp. 1-10.*
IBM Zurich Research Laboratory, "Web Services Security and Federated Identity Management", Mar. 8, 2005, pp. 1-13.*
Benjamin Weyl et al, "Protecting Privacy of Identities in Federated Operator Environments", May 20, 2005, pp. 1-5.*
IBM Zurich Research Laboratory, "Federated Identity-Management Protocols", Jul. 9, 2005, pp. 1-22.*

* cited by examiner

Primary Examiner—Neveen Abel Jalil
Assistant Examiner—Tarek Chbouki
(74) Attorney, Agent, or Firm—Jeffrey S. LaBaw; David H. Judson

(57) ABSTRACT

A method is presented for transferring data objects between federated entities within a federated computational environment using artifacts. A first federated entity receives artifacts from a second federated entity that generates data objects, such as assertions, for use at or by the first federated entity. An artifact references a data object that is locally stored by the second federated entity, which is implemented as a distributed system having multiple data processing systems, each of which can generate artifacts and associated data objects and can proxy retrieval requests to systems within the second federated entity. Each artifact includes a tag that indicates the data processing system within the second federated entity that generated the artifact. When the second federated entity receives a retrieval request with an artifact from the first federated entity, the appropriate data object is retrieved from within the distributed data processing system using the artifact and the tag.

21 Claims, 8 Drawing Sheets

METHOD AND SYSTEM FOR DISTRIBUTED RETRIEVAL OF DATA OBJECTS USING TAGGED ARTIFACTS WITHIN FEDERATED PROTOCOL OPERATIONS

BACKGROUND OF THE INVENTION

1. Field of the Invention

The present invention relates to an improved data processing system and, in particular, to a method and apparatus for multicomputer data transferring. Still more particularly, the present invention is directed to networked computer systems.

2. Description of Related Art

To reduce the costs of user management and to improve interoperability among enterprises, federated computing spaces have been created. A federation is a loosely coupled affiliation of enterprises which adhere to certain standards of interoperability; the federation provides a mechanism for trust among those enterprises with respect to certain computational operations for the users within the federation. For example, a federation partner may act as a user's home domain or identity provider. Other partners within the same federation may rely on the user's identity provider for primary management of the user's authentication credentials, e.g., accepting a single-sign-on token that is provided by the user's identity provider.

As enterprises move to support federated business interactions, these enterprises should provide a user experience that reflects the increased cooperation between two businesses and minimizes the operational burdens of a user. Within these federations, these enterprises have begun to interoperate to support a variety of federation protocols of which a user may be unaware or may be only minimally aware. For example, federated enterprises may perform various types of operations for user account management, such as managing a user-specific alias identifier, that might require minimal interaction with the user to complete an operation. The federated enterprises should cooperate to an extent that the user is not confused or overburdened with knowledge of the underlying mechanism by which such types of operations are coordinated.

However, there is a tradeoff that should be considered in the implementation of these operations within a federation. Various operations, such as those that might require minimal interaction with the user to complete an operation, should also be performed in a manner that is efficient for the federated enterprises, particularly for those types of operations that might be required across all users within an enterprise. For example, when a particular operation needs to be performed for thousands or millions of users, such as all customers of a particular enterprise, the mechanism for performing the operation needs to be scalable such that it does not overburden the computational resources of the federated enterprise, yet these various types of operations may be implemented in a variety of ways that vary in their burdens upon the federated enterprises that are involved with the necessary operation.

One manner of addressing the burden on computational resources within a federated enterprise is to implement the federated functionality within a distributed data processing system. For example, the services of an identity provider could be supported within a distributed data processing system. However, the characteristics of a distributed data processing system may be problematic; some of the requirements of federated protocol operations would complicate the implementation of the functionality for performing those federated protocol operations within a distributed data processing system.

More specifically, federated entities, such as identity providers and service providers, generate data objects within a federated environment. Many federated operations or protocol profiles employ artifacts to retrieve data objects. The referential relationship between artifact-referenced data objects and associated artifacts must be maintained in any federated computational environment, whether or not the federated entity is implemented as a type of distributed data processing system. Although the functionality for performing federated protocol operations that employ artifacts may be implemented as a distributed data processing system, any such implementation would be complicated by the characteristics of a distributed data processing system.

Therefore, it would be advantageous to implement a federated enterprise and its computational infrastructure such that federated protocol operations within the data processing systems of the federated enterprises can be efficiently and configurably managed. It would be particularly advantageous to efficiently implement functionality for federated protocol operations within a distributed data processing system, particularly the functionality for performing federated protocol operations that employ artifacts.

SUMMARY OF THE INVENTION

A method, an apparatus, and a computer program product are presented for transferring data objects between federated entities within a federated computational environment through the use of artifacts. An artifact is received at a first federated entity, such as a service provider, from a second federated entity, such as an identity provider. The second federated entity generates data objects, such as assertions or any other type of data object, for use at or by the first federated entity in accordance with a trust relationship between the second federated entity and the first federated entity, and the artifact references a data object that is locally stored by the second federated entity. The second federated entity is implemented as a distributed data processing system having a set of data processing systems, each of which can generate artifacts and their associated data objects. Each artifact includes a tag that indicates the data processing system within the set of data processing systems of the second federated entity that generated the assertion.

A data object retrieval request that contains an artifact is received from the first federated entity at a first data processing system in the set of data processing systems of the second federated entity. The artifact and the tag are extracted from the data object retrieval request by the first data processing system and then employed by the first data processing system to retrieve the associated data object from a second data processing system in the set of data processing systems of the second federated entity, and a data object retrieval response is then returned from the second federated entity to the first federated entity.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
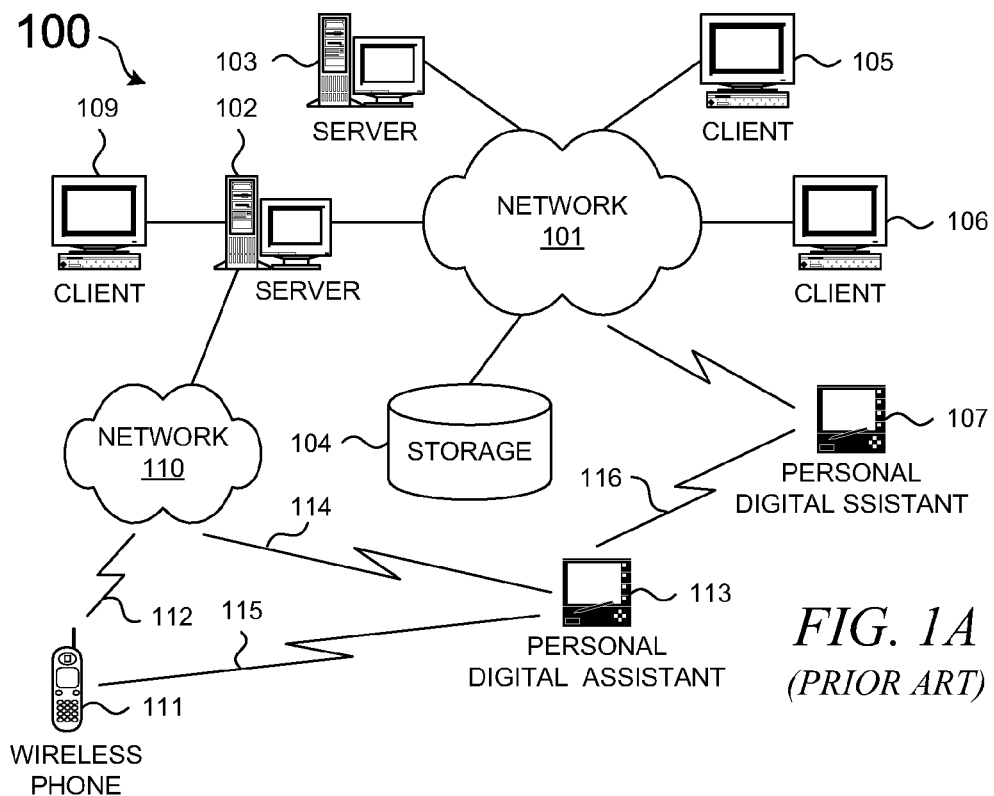
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
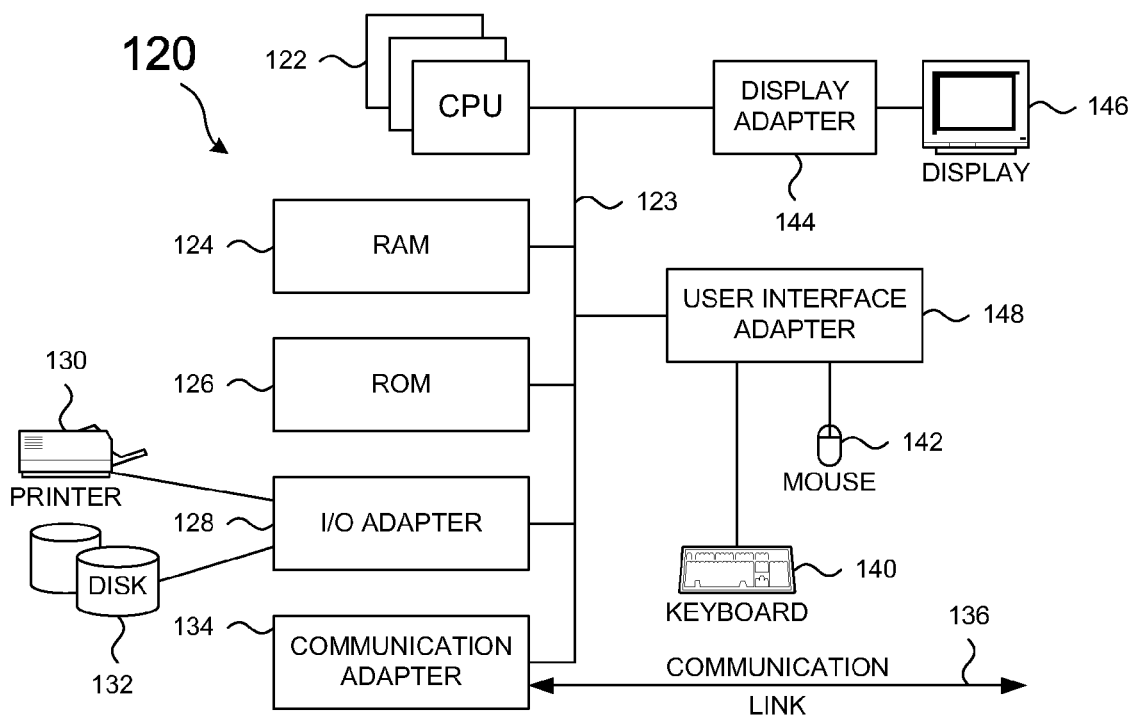
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Given the preceding brief description of some current technology, the description of the remaining figures relates to federated computer environments in which the present invention may operate. Prior to discussing the present invention in more detail, however, some terminology is introduced.

Terminology

The terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used with the present invention. More information on Kerberos may be found in Kohl et al., "The Kerberos Network Authentication Service (V5)", Internet Engineering Task Force (IETF) Request for Comments (RFC) 1510, September 1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May, 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, various assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically but not necessarily a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, etc. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Federation Model for Computing Environment that May Incorporate the Present Invention In the context of the World Wide Web, users are coming to expect the ability to jump from interacting with an application on one Internet domain to another application on another domain with minimal regard to the information barriers between each particular domain. Users do not want the frustration that is caused by having to authenticate to multiple domains for a single transaction. In other words, users expect that organizations should interoperate, but users generally want domains to respect their privacy. In addition, users may prefer to limit the domains that permanently store private information. These user expectations exist in a rapidly evolving heterogeneous environment in which many enterprises and organizations are promulgating competing authentication techniques.

The present invention is supported within a federation model that allows enterprises to provide a single-sign-on experience to a user. In other words, the present invention may be implemented within a federated, heterogeneous environment. As an example of a transaction that would benefit from a federated, heterogeneous environment, a user is able to authenticate to a domain and then have the domain provide the appropriate assertions to each downstream domain that might be involved in a transaction. These downstream domains need to be able to understand and trust authentication assertions and/or other types of assertions, even though there are no pre-established assertion formats between the domain and these other downstream domains. In addition to recognizing the assertions, the downstream domains need to be able to translate the identity contained within an assertion to an identity that represents the user within a particular domain, even though there is no pre-established identity mapping relationship.

The present invention is supported within a federated environment. In general, an enterprise has its own user registry and maintains relationships with its own set of users. Each enterprise typically has its own means of authenticating these users. However, the federated scheme for use with the present invention allows enterprises to cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

In the context of the present invention, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions, e.g., authentication tokens, that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider.

The system that supports the present invention also concerns a federated identity management system that establishes a foundation in which loosely coupled authentication, user enrollment, user profile management and/or authorization services collaborate across security domains. Federated identity management allows services residing in disparate security domains to securely interoperate and collaborate even though there may be differences in the underlying security mechanisms and operating system platforms at these disparate domains.

Identity Provider vs. Service Provider

As mentioned above and as explained in more detail further below, a federated environment provides significant user benefits. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

Figure 2:
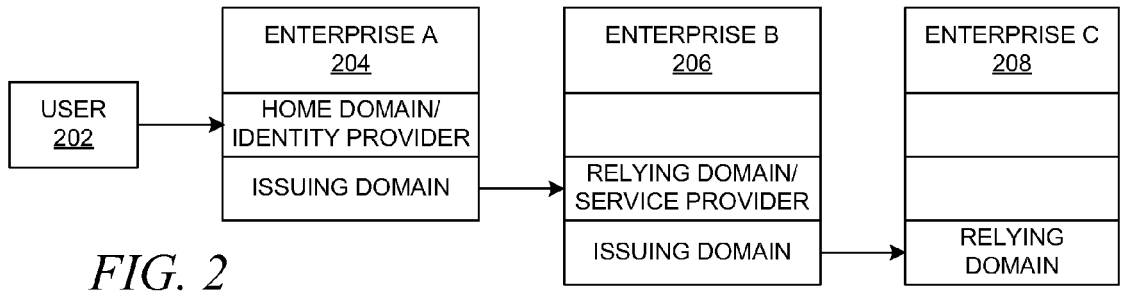
FIG. 2 depicts a block diagram that illustrates the terminology of the federated environment with respect to a transaction that is initiated by a user to a first federated enterprise, which, in response, invokes actions at downstream entities within the federated environment.

With reference now to FIG. 2, a block diagram depicts the terminology of the federated environment with respect to a transaction that is initiated by a user to a first federated enterprise, which, in response, invokes actions at downstream entities within the federated environment. FIG. 2 shows that the terminology may differ depending on the perspective of an entity within the federation for a given federated operation. More specifically, FIG. 2 illustrates that a computing environment that supports the present invention supports the transitivity of trust and the transitivity of the authentication assertion process; a domain or an entity can issue an assertion based on its trust in an identity as asserted by another domain or another entity.

User 202 initiates a transaction through a request for a protected resource at enterprise 204. If user 202 has been authenticated by enterprise 204 or will eventually be authenticated by enterprise 204 during the course of a transaction, then enterprise 204 may be termed the user's home domain for this federated session. Assuming that the transaction requires some type of operation by enterprise 206 and enterprise 204 transfers an assertion to enterprise 206, then enterprise 204 is the issuing entity with respect to the particular operation, and enterprise 206 is the relying entity for the operation.

The issuing entity issues an assertion for use by the relying domain; an issuing entity is usually, but not necessarily, the user's home domain or the user's identity provider. Hence, it would usually be the case that the issuing party has authenticated the user using a typical authentication operation. However, it is possible that the issuing party has previously acted as a relying party whereby it received an assertion from a different issuing party. In other words, since a user-initiated transaction may cascade through a series of enterprises within a federated environment, a receiving party may subsequently act as an issuing party for a downstream transaction. In general, any entity that has the ability to issue authentication assertions on behalf of a user can act as an issuing entity.

The relying entity is an entity that receives an assertion from an issuing entity. The relying party is able to accept, trust, and understand an assertion that is issued by a third party on behalf of the user, i.e. the issuing entity; it is generally the relying entity's duty to use an appropriate authentication authority to interpret an authentication assertion. A relying party is an entity that relies on an assertion that is presented on behalf of a user or another entity. In this manner, a user can be given a single-sign-on experience at the relying entity instead of requiring the relying entity to prompt the user for the user's authentication credentials as part of an interactive session with the user.

Referring again to FIG. 2, assuming that the transaction requires further operations such that enterprise 206 transfers an assertion to enterprise 208, then enterprise 206 is an upstream entity that acts as the issuing entity with respect to the subsequent or secondary transaction operation, and enterprise 208 is a downstream entity that acts as the relying entity for the operation; in this case, enterprise 208 may be regarded as another downstream entity with respect to the original transaction, although the subsequent transaction can also be described with respect to only two entities.

As shown in FIG. 2, a federated entity may act as a user's home domain, which provides identity information and attribute information about federated users. An entity within a federated computing environment that provides identity information, identity or authentication assertions, or identity services may be termed an identity provider. Other entities or federation partners within the same federation may rely on an identity provider for primary management of a user's authentication credentials, e.g., accepting a single-sign-on token that is provided by the user's identity provider; a domain at which the user authenticates may be termed the user's (authentication) home domain. The identity provider may be physically supported by the user's employer, the user's ISP, or some other commercial entity.

An identity provider is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

In some circumstances, there may be multiple entities within a federated environment that may act as identity providers for a user. For example, the user may have accounts at multiple federated domains, each of which is able to act as an identity provider for the user; these domains do not necessarily have information about the other domains nor about a user's identity at a different domain.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

Within some federated transactions that require the interoperation of multiple service providers, a downstream service provider may accept an assertion from an upstream service provider; the conditions in which an upstream service provider may act as an issuing entity to a downstream service provider that is acting as a relying party may depend upon the type of trust relationship between the service providers and the type of transaction between the service providers. Within the scope of a simple federated transaction, however, there is only one entity that acts as an issuing entity.

The present invention may be supported within a given computing environment in which a federated infrastructure can be added to existing systems while minimizing the impact on an existing, non-federated architecture. Hence, operations, including authentication operations, at any given enterprise or service provider are not necessarily altered by the fact that an entity may also participate within a federated environment. In other words, even though an entity's computing systems may be integrated into a federated environment, a user may be able to continue to perform various operations, including authentication operations, directly with an enterprise in a non-federated manner. However, the user may be able to have the same end-user experience while performing a federated operation with respect to a given entity as if the user had performed a similar operation with the given entity in a non-federated manner. Hence, it should be noted that not all of a given enterprise's users necessarily participate federated transactions when the given enterprise participates in a federation; some of the enterprise's users may interact with the enterprise's computing systems without performing any federated transactions.

Moreover, user registration within the computing environment of a given enterprise, e.g., establishment of a user account in a computer system, is not necessarily altered by the fact that the enterprise may also participate within a federated environment. For example, a user may still establish an account at a domain through a legacy or pre-existing registration process that is independent of a federated environment. Hence, in some cases, the establishment of a user account at an enterprise may or may not include the establishment of account information that is valid across a federation when the enterprise participates within a federated computing environment.

Federated Architecture—Federation Front-End for Legacy Systems

Figure 3:
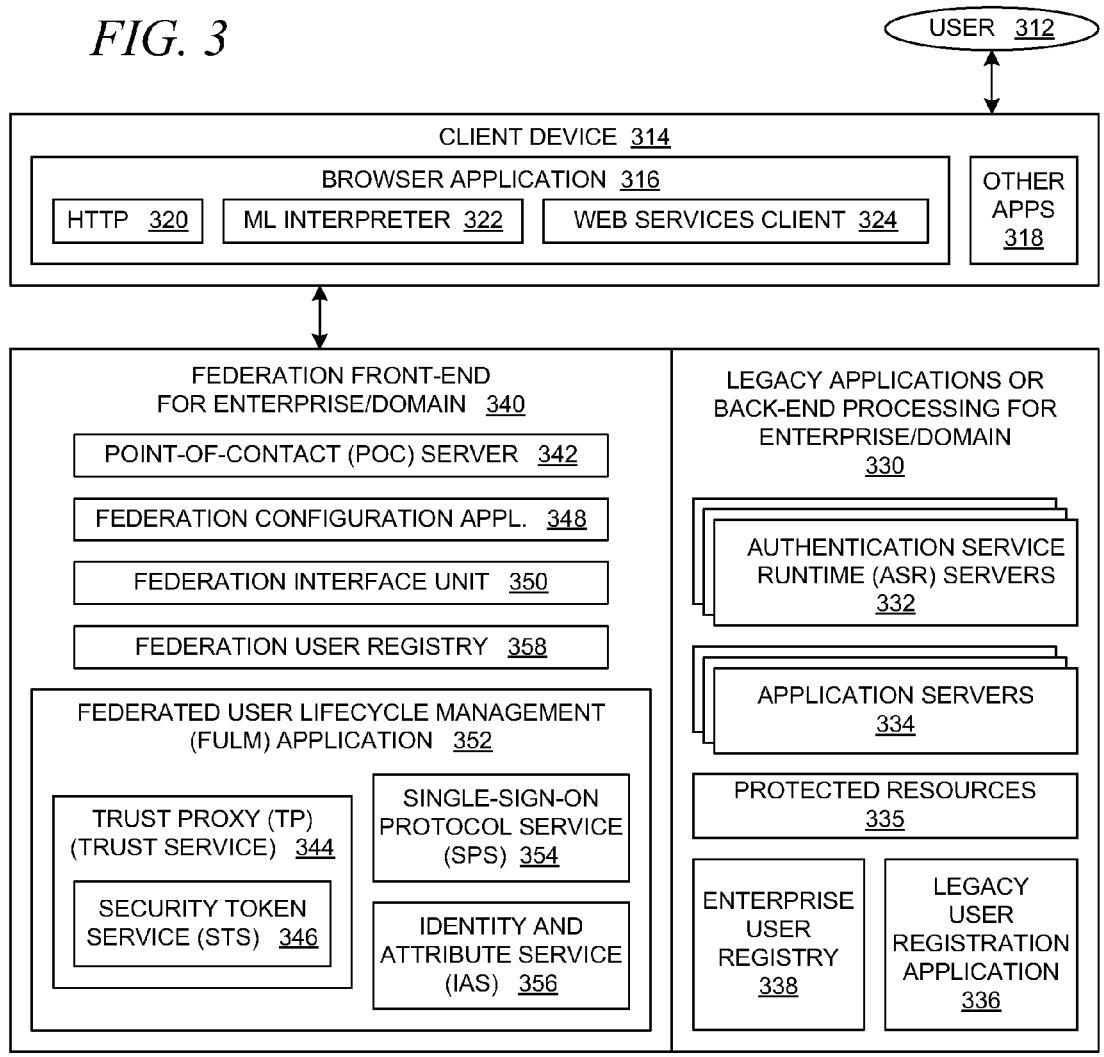
FIG. 3 depicts a block diagram that illustrates the integration of pre-existing data processing systems at a given domain with some federated architecture components that may be used to support an embodiment of the present invention.

With reference now to FIG. 3, a block diagram depicts the integration of pre-existing data processing systems at a given domain with some federated architecture components that may be used to support an embodiment of the present invention. A federated environment includes federated entities that provide a variety of services for users. User 312 interacts with client device 314, which may support browser application 316 and various other client applications 318. User 312 is distinct from client device 314, browser 316, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, etc., that may be assumed to act on behalf of the user.

Browser application 316 may be a typical browser, including those found on mobile devices, that comprises many modules, such as HTTP communication component 320 and markup language (ML) interpreter 322. Browser application 316 may also support plug-ins, such as web services client 324, and/or downloadable applets, which may or may not require a virtual machine runtime environment. Web services client 324 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined datatypes; and a convention for representing remote procedure calls and responses. User 312 may access web-based services using browser application 316, but user 312 may also access web services through other web service clients on client device 314. Some of the federated operations may employ HTTP redirection via the user's browser to exchange information between entities in a federated environment. However, it should be noted that the present invention may be supported over a variety of communication protocols and is not meant to be limited to HTTP-based communications. For example, the entities in the federated environment may communicate directly when necessary; messages are not required to be redirected through the user's browser.

The present invention may be supported in a manner such that components that are required for a federated environment can be integrated with pre-existing systems. FIG. 3 depicts one embodiment for implementing these components as a front-end to a pre-existing system. The pre-existing components at a federated domain can be considered as legacy applications or back-end processing components 330, which include authentication service runtime (ASR) servers 332 in a manner similar to that shown in FIG. 4. ASR servers 332 are responsible for authenticating users when the domain controls access to application servers 334, which can be considered to generate, retrieve, or otherwise support or process protected resources 335. The domain may continue to use legacy user registration application 336 to register users for access to application servers 334. Information that is needed to authenticate a registered user with respect to legacy operations is stored in enterprise user registry 338; enterprise user registry 338 may be accessible to federation components as well.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federation front-end processing 340, which includes point-of-contact server 342 and trust proxy server 344 (or more simply, trust proxy 344 or trust service 344) which itself interacts with Security Token Service (STS) 346, which are described in more detail below with respect to FIG. 4. Federation configuration application 348 allows an administrative user to configure the federation front-end components to allow them to interface with the legacy back-end components through federation interface unit 350. Federated functionality may be implemented in distinct system components or modules. In a preferred embodiment, most of the functionality for performing federation operations may be implemented by a collection of logical components within a single federation application; federated user lifecycle management application 352 includes trust service 344 along with single-sign-on protocol service (SPS) 354. Trust service 344 may comprise identity-and-attribute service (IAS) 356, which is responsible for identity mapping operations, attribute retrieval, etc., as part of federation functionality. Identity-and-attribute service 356 may also be employed by single-sign-on protocol service 354 during single-sign-on operations. A federation user registry 358 may be employed in certain circumstances to maintain user-related information for federation-specific purposes.

Legacy or pre-existing authentication services at a given enterprise may use various, well known, authentication methods or tokens, such as username/password or smart card token-based information. However, in a preferred federated computing system for supporting the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federation front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy such that it appears as if the user was engaged in an authentication dialog.

Figure 4:
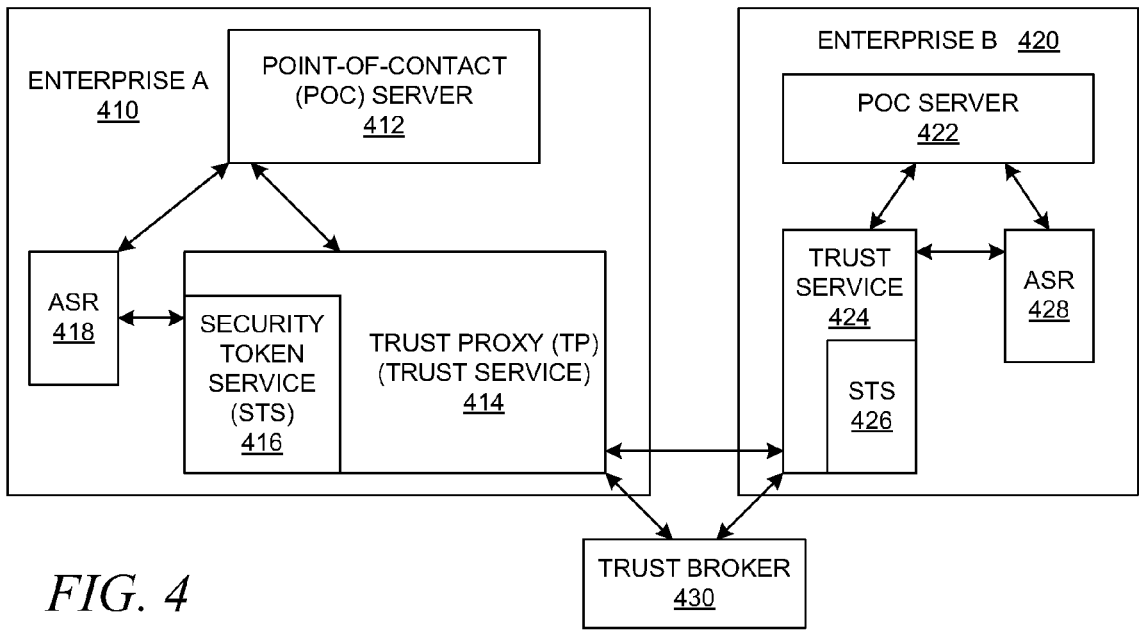
FIG. 4 depicts a block diagram that illustrates an example of a manner in which some components within a federated architecture may be used to establish trust relationships to support an implementation of the present invention.

Federated Architecture—Point-of-Contact Servers, Trust Proxies, and Trust Brokers With reference now to FIG. 4, a block diagram depicts an example of a manner in which some components within a federated architecture may be used to establish trust relationships to support an implementation of the present invention. A federated environment includes federated enterprises or similar entities that provide a variety of services for users. A user, through an application on a client device, may attempt to access resources at various entities, such as enterprise 410. A point-of-contact server at each federated enterprise, such as point-of-contact (POC) server 412 at enterprise 410, is the entry point into the federated environment for requests from a client to access resources that are supported and made available by enterprise 410. The point-of-contact server minimizes the impact on existing components within an existing, non-federated architecture, e.g., legacy systems, because the point-of-contact server handles many of the federation requirements. The point-of-contact server provides session management, protocol conversion, and possibly initiates authentication and/or attribute assertion conversion. For example, the point-of-contact server may translate HTTP or HTTPS messages to SOAP and vice versa. As explained in more detail further below, the point-of-contact server may also be used to invoke a trust proxy to translate assertions, e.g., a SAML token received from an issuing party can be translated into a Kerberos token understood by a receiving party.

A trust service (also termed a trust proxy, a trust proxy server, or a trust service), such as trust proxy (TP) 414 at enterprise 410, establishes and maintains a trust relationship between two entities in a federation. A trust service generally has the ability to handle authentication token format translation (through the security token service, which is described in more detail further below) from a format used by the issuing party to one understood by the receiving party.

Together, the use of a point-of-contact server and a trust service minimize the impact of implementing a federated architecture on an existing, non-federated set of systems. Hence, the exemplary federated architecture requires the implementation of at least one point-of-contact server and at least one trust service per federated entity, whether the entity is an enterprise, a domain, or other logical or physical entity. The exemplary federated architecture, though, does not necessarily require any changes to the existing, non-federated set of systems. Preferably, there is a single trust service for a given federated entity, although there may be multiple instances of a trust service component for availability purposes, or there may be multiple trust services for a variety of smaller entities within a federated entity, e.g., separate subsidiaries within an enterprise. It is possible that a given entity could belong to more than one federation, although this scenario would not necessarily require multiple trust services as a single trust service may be able to manage trust relationships within multiple federations.

One role of a trust service may be to determine or to be responsible for determining the required token type by another domain and/or the trust service in that domain. A trust service has the ability or the responsibility to handle authentication token format translation from a format used by the issuing party to one understood by the receiving party. Trust service 414 may also be responsible for any user identity translation or attribute translation that occurs for enterprise 410, or this responsibility may be supported by a distinct identity-and-attribute service, e.g., such as identity-and-attribute service 356 as shown in FIG. 3. In addition, a trust service can support the implementation of aliases as representatives of a user identity that uniquely identify a user without providing any addition information about the user's real world identity. Furthermore, a trust proxy can issue authorization and/or session credentials for use by the point-of-contact server. However, a trust service may invoke a trust broker for assistance, as described further below. Identity translation may be required to map a user's identity and attributes as known to an issuing party to one that is meaningful to a receiving party. This translation may be invoked by either a trust service at an issuing entity, a trust service at a receiving entity, or both.

Trust service 414, or a distinct identity-and-attribute service as mentioned above, may include (or interact with) an internalized component, shown as security token service (STS) component 416, which will provide token translation and will invoke authentication service runtime (ASR) 418 to validate and generate tokens. The security token service provides the token issuance and validation services required by the trust service, which may include identity translation. The security token service therefore includes an interface to existing authentication service runtimes, or it incorporates authentication service runtimes into the service itself. Rather than being internalized within the trust service, the security token service component may also be implemented as a stand-alone component, e.g., to be invoked by the trust service, or it may be internalized within a transaction server, e.g., as part of an application server.

For example, a security token service component may receive a request to issue a Kerberos token. As part of the authentication information of the user for whom the token is to be created, the request may contain a binary token containing a username and password. The security token service component will validate the username and password against, e.g., an LDAP runtime (typical authentication) and will invoke a Kerberos KDC (Key Distribution Center) to generate a Kerberos ticket for this user. This token is returned to the trust service for use within the enterprise; however, this use may include externalizing the token for transfer to another domain in the federation.

A user may desire to access resources at multiple enterprises within a federated environment, such as both enterprise 410 and enterprise 420. In a manner similar to that described above for enterprise 410, enterprise 420 comprises point-of-contact server 422, trust service 424, security token service (STS) 426, and authentication service runtime 428. Although the user may directly initiate separate transactions with each enterprise, the user may initiate a transaction with enterprise 410 which cascades throughout the federated environment. Enterprise 410 may require collaboration with multiple other enterprises within the federated environment, such as enterprise 420, to complete a particular transaction, even though the user may not have been aware of this necessity when the user initiated a transaction. Enterprise 420 becomes involved as a downstream entity, and enterprise 410 may present a assertion to enterprise 420 if necessary in order to further the user's federated transaction.

It may be the case that a trust service does not know how to interpret the authentication token that is received by an associated point-of-contact server and/or how to translate a given user identity and attributes. In this case, the trust service may choose to invoke functionality at a trust broker component, such as trust broker 430. A trust broker maintains relationships with individual trust proxies/services, thereby providing transitive trust between trust services. Using a trust broker allows each entity within a federated environment, such enterprises 410 and 420, to establish a trust relationship with the trust broker rather than establishing multiple individual trust relationships with each entity in the federated environment. For example, when enterprise 420 becomes involved as a downstream entity for a transaction initiated by a user at enterprise 410, trust service 414 at enterprise 410 can be assured that trust service 424 at enterprise 420 can understand an assertion from trust service 414 by invoking assistance at trust broker 430 if necessary. Although FIG. 4 depicts the federated environment with a single trust broker, a federated environment may have multiple trust brokers.

It should be noted that although FIG. 4 depicts point-of-contact server 412, trust service 414, security token service component 416, and authentication service runtime 418 as distinct entities, it is not necessary for these components to be implemented on separate components. For example, it is possible for the functionality of these separate components to be implemented as a single application, as applications on a single physical device, or as distributed applications on multiple physical devices. In addition, FIG. 4 depicts a single point-of-contact server, a single trust service, and a single security token server for an enterprise, but an alternative configuration may include multiple point-of-contact servers, multiple trust services, and multiple security token servers for each enterprise. The point-of-contact server, the trust service, the security token service, and other federated entities may be implemented in various forms, such as software applications, objects, modules, software libraries, etc.

A trust service/STS may be capable of accepting and validating many different authentication credentials, including traditional credentials such as a username and password combinations and Kerberos tickets, and federated authentication token formats, including authentication tokens produced by a third party. A trust service/STS may allow the acceptance of an authentication token as proof of authentication elsewhere. The authentication token is produced by an issuing party and is used to indicate that a user has already authenticated to that issuing party. The issuing party produces the authentication token as a means of asserting the authenticated identity of a user. A trust service/STS is also able to process attribute tokens or tokens that are used to secure communication sessions or conversations, e.g., those that are used to manage session information in a manner similar to an SSL session identifier.

A security token service invokes an authentication service runtime as necessary. The authentication service runtime supports an authentication service capable of authenticating a user. The authentication service acts as an authentication authority that provides indications of successful or failed authentication attempts via authentication responses. The trust service/STS may internalize an authentication service, e.g., a scenario in which there is a brand-new installation of a web service that does not need to interact with an existing legacy infrastructure. Otherwise, the security token service component will invoke external authentication services for validation of authentication tokens. For example, the security token service component could "unpack" a token containing a username/password and then use an LDAP service to access a user registry to validate the presented credentials.

When used by another component such as an application server, the security token service component can be used to produce tokens required for single-sign-on to legacy authentication systems; this functionality may be combined with or replaced by functionality within a single-sign-on protocol service, such as SPS 354 that is shown in FIG. 3. Hence, the security token service component can be used for token translation for internal purposes, i.e. within an enterprise, and for external purposes, i.e. across enterprises in a federation. As an example of an internal purpose, a Web application server may interface to a mainframe via an IBM CICS (Customer Information Control System) transaction gateway; CICS is a family of application servers and connectors that provides enterprise-level online transaction management and connectivity for mission-critical applications. The Web application server may invoke the security token service component to translate a Kerberos ticket (as used internally by the Web application server) to an IBM RACF® passticket required by the CICS transaction gateway.

The entities that are shown in FIG. 4 can be explained using the terminology that was introduced above, e.g., "identity provider" and "service provider". As part of establishing and maintaining trust relationships, an identity provider's trust service can determine what token types are required/accepted by a service provider's trust service. Thus, trust services use this information when invoking token services from a security token service. When an identity provider's trust service is required to produce an authentication assertion for a service provider, the trust service determines the required token type and requests the appropriate token from the security token service.

When a service provider's trust service receives an authentication assertion from an identity provider, the trust service knows what type of assertion that it expected and what type of assertion that it needs for internal use within the service provider. The service provider's trust service therefore requests that the security token service generate the required internal-use token based on the token in the received authentication assertion.

Both trust services and trust brokers have the ability to translate an assertion received from an identity provider into a format that is understood by a service provider. The trust broker has the ability to interpret the assertion format (or formats) for each of the trust services with whom there is a direct trust relationship, thereby allowing the trust broker to provide assertion translation between an identity provider and a service provider. This translation can be requested by either party through its local trust service. Thus, the identity provider's trust service can request translation of an assertion before it is sent to the service provider. Likewise, the service provider's trust service can request translation of an assertion received from an identity provider.

Assertion translation comprises user identity translation, authentication assertion translation, attribute assertion translation, or other forms of assertion translation. Reiterating the point above, assertion translation is handled by the trust components within a federation, e.g., trust services and trust brokers. A trust service may perform the translation locally, either at the identity provider or at the service provider, or a trust service may invoke assistance from a trust broker.

Assuming that an identity provider and a service provider already have individual trust relationships with a trust broker, the trust broker can dynamically create, i.e. broker, new trust relationships between issuing parties and relying parties if necessary. After the initial trust relationship brokering operation that is provided by the trust broker, the identity provider and the service provider may directly maintain the relationship so that the trust broker need not be invoked for future translation requirements. It should be noted that translation of authentication tokens can happen at three possible places: the identity provider's trust service, the service provider's trust service, and the trust broker. Preferably, the identity provider's trust service generates an authentication assertion that is understood by the trust broker to send to the service provider. The service provider then requests a translation of this token from the trust broker into a format recognizable by the service provider. Token translation may occur before transmission, after transmission, or both before and after transmission of the authentication assertion.

Trust Relationships within Federated Architecture

Within an exemplary federated environment that is able to support the present invention, there are two types of "trust domains" that must be managed: enterprise trust domains and federation trust domains. The differences between these two types of trust domain are based in part on the business agreements governing the trust relationships with the trust domain and the technology used to establish trust. An enterprise trust domain contains those components that are managed by the enterprise; all components within that trust domain may implicitly trust each other. In general, there are no business agreements required to establish trust within an enterprise because the deployed technology creates inherent trust within an enterprise, e.g., by requiring mutually authenticated SSL sessions between components or by placing components within a single, tightly controlled data center such that physical control and proximity demonstrate implicit trust. Referring to FIG. 2B, the legacy applications and back-end processing systems may represent an enterprise trust domain, wherein the components communicate on a secure internal network.

Federation trust domains are those that cross enterprise boundaries; from one perspective, a federation trust domain may represent trust relationships between distinct enterprise trust domains. Federation trust domains are established through trust proxies across enterprise boundaries between federation partners. Trust relationships involve some sort of a bootstrapping process by which initial trust is established between trust proxies. Part of this bootstrap process may include the establishment of shared secret keys and rules that define the expected and/or allowed token types and identifier translations. In general, this bootstrapping process can be implemented out-of-band as this process may also include the establishment of business agreements that govern an enterprise's participation in a federation and the liabilities associated with this participation.

There are a number of possible mechanisms for establishing trust in a federated business model. In a federation model, a fundamental notion of trust between the federation participants is required for business reasons in order to provide a level of assurance that the assertions (including tokens and attribute information) that are transferred between the participants are valid. If there is no trust relationship, then the service provider cannot depend upon the assertions received from the identity provider; they cannot be used by the service provider to determine how to interpret any information received from the identity provider.

For example, a large corporation may want to link several thousand global customers, and the corporation could use non-federated solutions. As a first example, the corporation could require global customers to use a digital certificate from a commercial certificate authority to establish mutual trust. The commercial certificate authority enables the servers at the corporation to trust servers located at each of the global customers. As a second example, the corporation could implement third-party trust using Kerberos; the corporation and its global customers could implement a trusted third-party Kerberos domain service that implements shared-secret-based trust. As a third example, the corporation could establish a private scheme with a proprietary security message token that is mutually trusted by the servers of its global customers.

Any one of these approaches may be acceptable if the corporation needed to manage trust relationships with a small number of global customers, but this may become unmanageable if there are hundreds or thousands of potential federation partners. For example, while it may be possible for the corporation to force its smaller partners to implement a private scheme, it is unlikely that the corporation will be able to impose many requirements on its larger partners.

An enterprise may employ trust relationships established and maintained through trust proxies and possibly trust brokers. An advantage of the exemplary federated architecture that is shown in the figures is that it does not impose additional requirements above and beyond the current infrastructures of an enterprise and its potential federation partners.

However, this exemplary federation architecture does not relieve an enterprise and its potential federation partners from the preliminary work required to establish business and liability agreements that are required for participation in the federation. In addition, the participants cannot ignore the technological bootstrapping of a trust relationship. The exemplary federation architecture allows this bootstrapping to be flexible, e.g., a first federation partner can issue a Kerberos ticket with certain information, while a second federation partner can issue a SAML authentication assertion with certain information.

In the exemplary federation architecture, the trust relationships are managed by the trust proxies, which may include (or may interact with) a security token service that validates and translates a token that is received from an identity provider based on the pre-established relationship between two trust proxies. In situations where it is not feasible for a federated enterprise to establish trust relationships (and token translation) with another federated enterprise, a trust broker may be invoked; however, the federated enterprise would need to establish a relationship with a trust broker.

Figure 5:
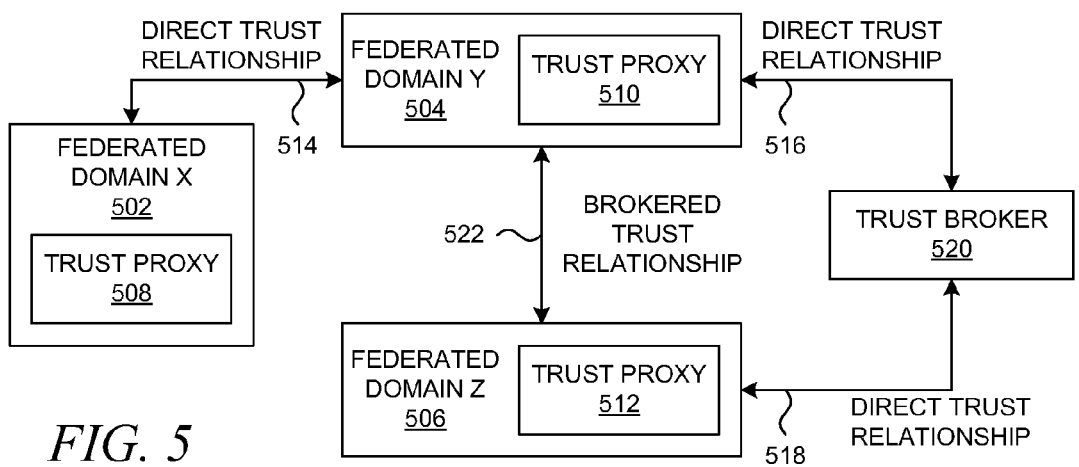
FIG. 5 depicts a block diagram that illustrates an exemplary set of trust relationships between federated domains using trust proxies and a trust broker in accordance with an exemplary federated architecture that is able to support the present invention.

With reference now to FIG. 5, a block diagram depicts an exemplary set of trust relationships between federated domains using trust proxies and a trust broker in accordance with an exemplary federated architecture that is able to support the present invention. Although FIG. 4 introduced the trust broker, FIG. 5 illustrates the importance of transitive trust relationships within the exemplary federated architecture.

Federated domains 502-506 incorporate trust proxies 508-512, respectively. Trust proxy 508 has direct trust relationship 514 with trust proxy 510. Trust broker 520 has direct trust relationship 516 with trust proxy 510, and trust broker 520 has direct trust relationship 518 with trust proxy 512. Trust broker 520 is used to establish, on behalf of a federation participant, a trust relationship based on transitive trust with other federation partners. The principle of transitive trust allows trust proxy 510 and trust proxy 512 to have brokered trust relationship 522 via trust broker 520. Neither trust proxy 510 nor 512 need to know how to translate or validate the other's assertions; the trust broker may be invoked to translate an assertion into one that is valid, trusted, and understood at the other trust proxy.

Business agreements that specify contractual obligations and liabilities with respect to the trust relationships between federated enterprises can be expressed in XML through the use of the ebXML (Electronic Business using XML) standards. For example, a direct trust relationship could be represented in an ebXML document; each federated domain that shares a direct trust relationship would have a copy of a contract that is expressed as an ebXML document. Operational characteristics for various entities within a federation may be specified within ebXML choreographies and published within ebXML registries; any enterprise that wishes to participate in a particular federation, e.g., to operate a trust proxy or trust broker, would need to conform to the published requirements that were specified by that particular federation for all trust proxies or trust brokers within the federation. A security token service could parse these ebXML documents for operational details on the manner in which tokens from other domains are to be translated. It should be noted, though, that other standards and mechanisms could be employed to support the present invention for specifying the details about the manner in which the trust relationships within a federation are implemented.

Single-Sign-on within Federated Architecture

During a given user's session, the user may visit many federated domains to use the web services that are offered by those domains. Domains can publish descriptions of services that they provide using standard specifications such as UDDI and WSDL, both of which use XML as a common data format. The user finds the available services and service providers through applications that also adhere to these standard specifications. SOAP provides a paradigm for communicating requests and responses that are expressed in XML. Entities within a federated environment may employ these standards among others.

Within a federation, a user expects to have a single-sign-on experience in which the user completes a single authentication operation, and this authentication operation suffices for the duration of the user's session, regardless of the federation partners visited during that session. A session can be defined as the set of transactions from (and including) the initial user authentication, i.e. logon, to logout. Within a session, a user's actions will be governed in part by the privileges granted to the user for that session.

The federated architecture that is described hereinabove supports single-sign-on operations. To facilitate a single-sign-on experience, web services that support the federated environment will also support using an authentication assertion or security token generated by a third-party to provide proof of authentication of a user. This assertion will contain some sort of evidence of the user's successful authentication to the issuing party together with an identifier for that user. For example, a user may complete traditional authentication operation with one federation partner, e.g., by providing a username and password that the federation partners uses to build authentication credentials for the user, and then the federation partner is able to provide a SAML authentication assertion that is generated by the authenticating/issuing party to a different federation partner.

The federated environment also allows web services or other applications to request web services, and these web services would also be authenticated. Authentication in a web services environment is the act of verifying the claimed identity of the web services request so that the enterprise can restrict access to authorized clients. A user who requests or invokes a web service would almost always be authenticated, so the need for authentication within a federated environment that supports the present invention is not any different from current requirements of web services for user authentication.

Authentication of users that are accessing the computational resources of an enterprise without participating in a federated session are not impacted by the presence of a federated infrastructure. For example, an existing user who authenticates with a forms-based authentication mechanism over HTTP/S to access non-federated resources at a particular domain is not affected by the introduction of support at the domain for the federated environment. Authentication is handled in part by a point-of-contact server, which in turn may invoke a separate trust proxy or trust service component; the use of a point-of-contact server minimizes the impact on the infrastructure of an existing domain. For example, the point-of-contact server can be configured to pass through all non-federated requests to be handled by the back-end or legacy applications and systems at the domain.

The point-of-contact server may choose to invoke an HTTP-based authentication method, such as basic authentication, forms-based authentication, or some other authentication method. The point-of-contact server also supports a federation domain by supporting the processing of an assertion that has been presented by the user as proof of authentication, such as an SAML authentication assertion, wherein the assertion has crossed between enterprise domains; the single-sign-on protocol service is used to recognize an assertion/artifact when it is received in the context of a federation protocol. The point-of-contact server may invoke the trust service, which in turn may invoke its security token service for validation of authentication credentials/security tokens.

Authentication of web services or other applications comprises the same process as authentication of users. Requests from web services carry a security token containing an authentication assertion, and this security token would be validated by the trust service in the same manner as a token presented by a user. A request from a web service should be accompanied by this token because the web service would have discovered what authentication assertions/security tokens were required by the requested service as advertised in UDDI.

Figure 6:
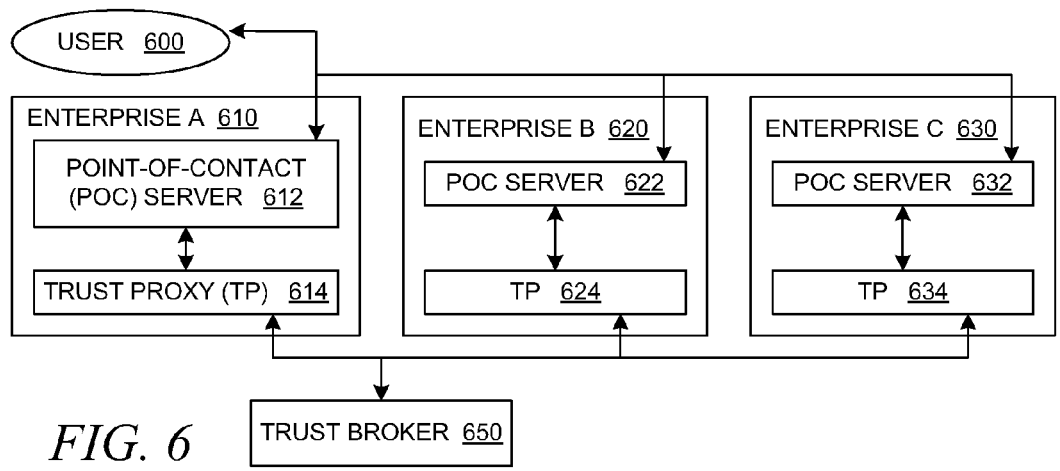
FIG. 6 depicts a block diagram that illustrates a federated environment that supports federated single-sign-on operations.

With reference now to FIG. 6, a block diagram depicts a federated environment that supports federated single-sign-on operations. User 600, through a client device and an appropriate client application, such as a browser, desires to access a web service that is provided by enterprise/domain 610, which supports data processing systems that act as a federated domain within a federated environment. Domain 610 supports point-of-contact server 612 and trust proxy or trust service 614; similarly, domain 620 supports point-of-contact server 622 and trust proxy or trust service 624, while domain 630 supports point-of-contact server 632 and trust proxy or trust service 634. The trust proxies/services rely upon trust broker 650 for assistance, as described above. Additional domains and trust proxies/services may participate in the federated environment. FIG. 6 is used to describe a federated single-sign-on operation between domain 610 and domain 620; a similar operation may occur between domain 610 and domain 630.

The user completes an authentication operation with respect to domain 610; this authentication operation is handled by point-of-contact server 612. The authentication operation is triggered when the user requests access to some resource that requires an authenticated identity, e.g., for access control purposes or for personalization purposes. Point-of-contact server 612 may invoke a legacy authentication service, or it may invoke trust proxy 614 to validate the user's presented authentication credentials. Domain 610 becomes the user's identity provider or home domain for the duration of the user's federated session.

At some later point in time, the user initiates a transaction at a federation partner, such as enterprise 620 that also supports a federated domain, thereby triggering a federated single-sign-on operation. For example, a user may initiate a new transaction at domain 620, or the user's original transaction may cascade into one or more additional transactions at other domains. As another example, the user may invoke a federated single-sign-on operation to a resource in domain 620 via point-of-contact server 612, e.g., by selecting a special link on a web page that is hosted within domain 610 or by requesting a portal page that is hosted within domain 610 but that displays resources hosted in domain 620. Point-of-contact server 612 sends a request to trust proxy 614 to generate a federation single-sign-on token for the user that is formatted to be understood or trusted by domain 620. Trust proxy 614 returns this token to point-of-contact server 612, which sends this token to point-of-contact server 622 in domain. Domain 610 acts as an issuing party for the user at domain 620, which acts as a relying party. The user's token would be transferred with the user's request to domain 620; this token may be sent using HTTP redirection via the user's browser, or it may be sent by invoking the request directly of point-of-contact server 622 (over HTTP or SOAP-over-HTTP) on behalf of the user identified in the token supplied by trust proxy 614.

Point-of-contact server 622 receives the request together with the federation single-sign-on token and invokes trust proxy 624. Trust proxy 624 receives the federation single-sign-on token, validates the token, and assuming that the token is valid and trusted, generates a locally valid token for the user. Trust proxy 624 returns the locally valid token to point-of-contact server 622, which establishes a session for the user within domain 620. If necessary, point-of-contact server 622 can initiate a federated single-sign-on at another federated partner.

Validation of the token at domain 620 is handled by the trust proxy 624, possibly with assistance from a security token service. Depending on the type of token presented by domain 610, the security token service may need to access a user registry at domain 620. For example, domain 620 may provide a binary security token containing the user's name and password to be validated against the user registry at domain 620. Hence, in this example, an enterprise simply validates the security token from a federated partner. The trust relationship between domains 610 and 620 ensures that domain 620 can understand and trust the security token presented by domain 610 on behalf of the user.

Federated single-sign-on requires not only the validation at the relying domain of the security token that is presented to a relying domain on behalf of the user but also, based on information contained in the security token, the determination of a locally valid user identifier and possibly attributes that are associated with this identifier. One result of a direct trust relationship and the business agreements that are required to establish such a relationship is that at least one party, either the issuing domain or the relying domain or both, will know how to translate the information provided by the issuing domain into an identifier that is valid at the relying domain; this identifier at the relying domain may be the result of a one-to-one mapping of the identity asserted by the issuing party or the result of another type of mapping, e.g., a many-to-one mapping of an identity to a role, i.e. it is not a requirement that this be a unique one-to-one mapping for local, issuing party identifiers. In the brief example above, it was assumed that the issuing domain, i.e. domain 610, is able to provide the relying domain, i.e. domain 620, with a user identifier that is valid in domain 620. In that scenario, the relying domain did not need to invoke any identity mapping functionality. Trust proxy 624 at domain 620 will generate a security token for the user that will "vouch-for" this user. The types of tokens that are accepted, the signatures that are required on tokens, and other requirements are all pre-established as part of the federation's business agreements. The rules and algorithms that govern identifier translation are also pre-established as part of the federation's business agreements and are defined by the agreed-upon policy for token management and exchange. In the case of a direct trust relationship between two participants, the identifier translation algorithms will have been established for those two parties and may not be relevant for any other parties in the federation.

However, it is not always the case that the issuing domain will know how to map the user from a local identifier for domain 610 to a local identifier for domain 620. In some cases, it may be the relying domain that knows how to do this mapping, while in yet other cases, neither party will know how to do this translation, in which case a third party trust broker may need to be invoked. In other words, in the case of a brokered trust relationship, the issuing and relying domains do not have a direct trust relationship with each other. They will, however, have a direct trust relationship with a trust broker, such as trust broker 650. Identifier mapping rules and algorithms will have been established as part of this relationship, and the trust broker will use this information to assist in the identifier translation that is required for a brokered trust relationship.

Domain 620 receives the token that is issued by domain 610 at point-of-contract server 622, which invokes trust proxy 624 to validate the token and perform identity mapping. In this case, since trust proxy 624 is not able to map the user from a local identifier for domain 610 to a local identifier for domain 620, trust proxy 624 invokes trust broker 650, which validates the token and performs the identifier mapping. After obtaining the local identifier for the user, trust proxy 624, possibly through its security token service, can generate any local tokens that are required by the back-end applications at domain 620, e.g., a Kerberos token may be required to facilitate single-sign-on from the point-of-contact server to the application server. After obtaining a locally valid token, if required, the point-of-contact server is able to build a local session for the user. The point-of-contract server may also handle coarse-grained authorization of user requests and forward the authorized requests to the appropriate application servers within domain 620.

Federated User Lifecycle Management

A portion of the above description of FIG.'s 2-6 explained an organization of components that may be used in a federated environment while other portions explained the processes for supporting single-sign-on operations across the federated environment. Service providers or relying domains within a federated environment do not necessarily have to manage a user's authentication credentials, and those relying domains can leverage a single single-sign-on token that is provided by the user's identity provider or home domain. The description of FIG.'s 2-6 above, though, does not explain an explicit process by which federated user lifecycle management may be accomplished in an advantageous manner at the federated domains of federation partners.

Federated user lifecycle management functionality/service comprises functions for supporting or managing federated operations with respect to the particular user accounts or user profiles of a given user at multiple federated domains; in some cases, the functions or operations are limited to a given federated session for the user. In other words, federated user lifecycle management functionality refers to the functions that allow management of federated operations across a plurality of federated partners, possibly only during the lifecycle of a single user session within a federated computing environment.

Each federated domain might manage a user account, a user profile, or a user session of some kind with respect to the functions at each respective federated domain. For example, a particular federated domain might not manage a local user account or user profile within the particular federated domain, but the federated domain might manage a local user session for a federated transaction after the successful completion of a single-sign-on operation at the federated domain. As part of the federated user lifecycle management functionality that is supported by that particular federated domain, the federated domain can participate in a single-sign-off operation that allows the federated domain to terminate the local user session after the federated transaction is complete, thereby improving security and promoting efficient use of resources.

In another example of the use of federated user lifecycle management functionality, a user may engage in an online transaction that requires the participation of multiple federated domains. A federated domain might locally manage a user profile in order to tailor the user's experience with respect to the federated domain during each of the user's federated sessions that involve the federated domain. As part of the federated user lifecycle management functionality that is supported by that particular federated domain, the information in the federated domain's local user profile can be used in a seamless manner during a given federated transaction with information from other profiles at other federated domains that are participating in the given federated transaction. For example, the information from the user's multiple local user profiles might be combined in some type of merging operation such that the user's information is visually presented to the user, e.g., within a web page, in a manner such that the user is not aware of the different origins or sources of the user's information.

Federated user lifecycle management functionality may also comprise functions for account linking/delinking. A user is provided with a common unique user identifier across federation partners, which enables single-sign-on and the retrieval of attributes (if necessary) about a user as part of the fulfillment of a request at one federation partner. Furthermore, the federation partner can request additional attributes from an identity provider using the common unique user identifier to refer to the user in an anonymous manner.

Figure 7:
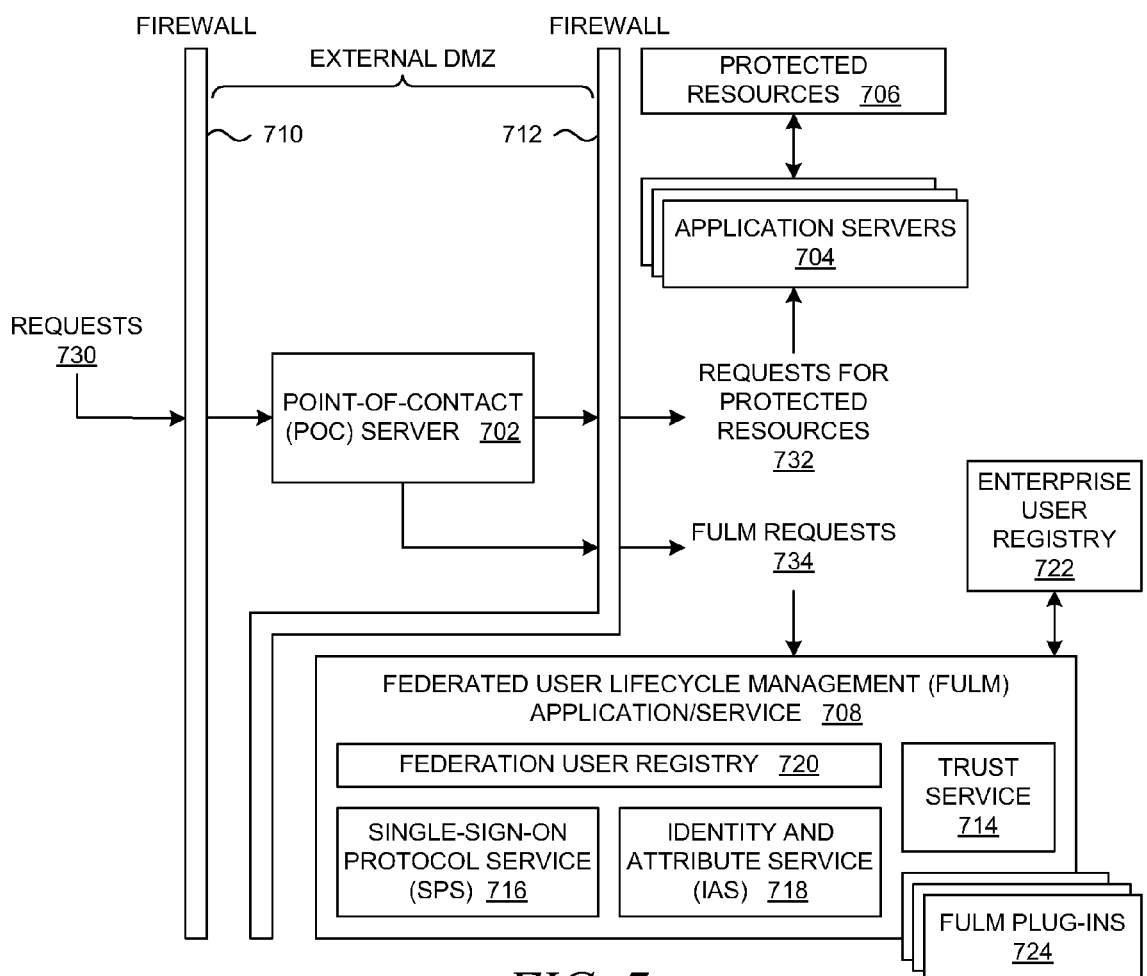
FIG. 7 depicts a block diagram that illustrates some of the components in a federated domain for implementing federated user lifecycle management functionality in order to support the present invention.

With reference now to FIG. 7, a block diagram depicts some of the components in a federated domain for implementing federated user lifecycle management functionality in order to support the present invention. FIG. 7 depicts elements at a single federated domain, such as the federated domain that is shown in FIG. 3. Some of the elements in FIG. 7 are similar or identical to elements that have been discussed hereinabove with respect to other figures, such as FIG. 3: point-of-contact server/service 702 is equivalent to point-of-contact server 342; application servers 704, which run services that control access to protected resources, are equivalent to application servers 334; protected or controlled resources 706 are equivalent to protected resources 335; and federated user lifecycle management (FULM) application 708 is equivalent to federated user lifecycle management application 352. Although firewalls were not illustrated within FIG. 3, firewalls are illustrated within FIG. 7. Firewall 710 and firewall 712 create an external DMZ (electronic DeMilitarized Zone) that protects the enterprise's computing environment from computing threats outside of the enterprise's domain, e.g., via the Internet.

The different perspectives that are shown in FIG. 3 and FIG. 7 are not incompatible or at cross-purposes. In contrast with the example that is shown in FIG. 7, FIG. 3 does not illustrate the firewalls, yet point-of-contact server 342 resides within federation front-end 340; in addition, federated user lifecycle management application 352 is contained within federation front-end 340. In FIG. 7, point-of-contact server 702 is illustrated as residing within the DMZ between firewalls 710 and 712, which form an electronic or physical front-end to the enterprise domain; in addition, federated user lifecycle management application/service 708 resides electronically behind firewall 712. Trust service 714, single-sign-on protocol service 716, and identity-and-attribute service 718 employ enterprise user registry 720 and federation user registry 722 as necessary. The different perspectives of FIG. 3 and FIG. 7 can be reconciled by regarding federation front-end 340 and back-end 330 in FIG. 3 as a logical organization of components while regarding the DMZ and the other components in FIG. 7 as forming a physical or electronic front-end and a physical or electronic back-end, either of which may contain federated components.

Reiterating the roles of a point-of-contact entity/service, the point-of-contact entity provides session management, at least with respect to a user's interaction with the federation functionality with an enterprise's computing environment; applications within a legacy back-end of the enterprise's computing environment may also implement its own session management functionality. Assuming that an enterprise implements policy functionality with respect to the federated computing environment, the point-of-contact entity may act as a policy enforcement point to some other federation partner's policy decision point. In addition, assuming that it is permissible given the implementation of the federation functionality, the point-of-contact entity is responsible for initiating a direction authentication operation against a user in those scenarios in which a single-sign-on operation is not employed. As such, the point-of-contact entity may be implemented in a variety of forms, e.g., as a reverse proxy server, as a web server plug-in, or in some other manner. The point-of-contact functionality may also be implemented within an application server itself, in which case the federated user lifecycle management services may be logically located within the DMZ.

More importantly, referring again to FIG. 7, federated user lifecycle management application 708 also comprises support for interfacing to, interacting with, or otherwise interoperating with federated user lifecycle management plug-ins 724, which are not shown in FIG. 3. In the exemplary architecture that is shown in FIG. 7, federated protocol runtime plug-ins provide the functionality for various types of independently published or developed federated user lifecycle management standards or profiles, such as: WS-Federation Passive Client; and Liberty Alliance ID-FF Single Sign On (B/A, B/P and LECP), Register Name Identifier, Federation Termination Notification, and Single Logout. Different sets of federated protocols may be accessed at different URI's. This approach allows the federated user lifecycle management application to concurrently support multiple standards or specifications of federated user lifecycle management, e.g., the WS-Federation web services specification versus the Liberty Alliance's specifications, within a single application, thereby minimizing the configuration impact on the overall environment for supporting different federation protocols.

More specifically, the appropriate federated user lifecycle management functionality is invoked by the point-of-contact server by redirecting and/or forwarding user requests to the federated user lifecycle management application as appropriate. Referring again to FIG. 7, point-of-contact server 702 receives user requests 730, which are then analyzed to determine the type of request that has been received, which might be indicated by the type of request message that has been received or, as noted above, by determining the destination URI within the request message. While requests 732 for protected resources continue to be forwarded to application servers 704, requests 734 for federated user lifecycle management functions, e.g., requests to invoke a single-sign-off operation, are forwarded to federated user lifecycle management application 708, which invokes the appropriate federated user lifecycle management plug-in as necessary to fulfill the received request. When a new federation protocol or a new federated function is defined, or when an existing one is somehow modified or refined, support can be added simply by plugging a new support module or can be refined by modifying a previously installed plug-in.

The exemplary implementation of a federated user lifecycle management application in FIG. 7 illustrates that the federated user lifecycle management application is able to support multiple, simultaneous, federated user lifecycle management functions while providing a pluggability feature, thereby allowing new functionality to be added to the federated user lifecycle management application in the form of a plug-in when needed without requiring any changes to the existing infrastructure. For example, assuming that the present invention is implemented using a Java™-based federated user lifecycle management application, support for a new federation protocol, such as a newly published single-sign-on protocol, can be added by configuring newly developed Java™ classes to the Java™ CLASSPATH of the federated user lifecycle management application, wherein these new classes support the new standard along with the protocol interface for supporting the present invention.

The exemplary federated architecture leverages the existing environment in which a federated user lifecycle management solution is to be integrated. The federated user lifecycle management application can be easily modified to support new protocols/standards as they evolve with minimal changes to the overall infrastructure. Any changes that might be required to support new federated user lifecycle management functionality are located almost exclusively within the federated user lifecycle management application, which would require configuring the federated user lifecycle management application to understand the added functionality.

There may be minimal configuration changes in other federated components, e.g., at a point-of-contact server, in order to allow the overall infrastructure to be able to invoke new federated user lifecycle management functionality while continuing to support existing federated user lifecycle management functionality. However, the federated user lifecycle management applications are functionally independent from the remainder of the federated components in that the federated user lifecycle management applications may require only minimal interaction with other federated components of the federated environment. For example, in an exemplary embodiment, the federated user lifecycle management functionality may integrate with an enterprise-based datastore, e.g., an LDAP datastore, if federated user lifecycle management information, such as NameIdentifier values in accordance with the Liberty Alliance profiles, are to be stored in an externally-accessible federated user lifecycle management datastore as opposed to a private, internal, federated user lifecycle management datastore that is not apparent or accessible to external entities.

Hence, an existing environment needs minimal modifications to support federated user lifecycle management functionality. Moreover, changes to federated user lifecycle management functionality, including the addition of new functionality, have minimal impact on an existing federated environment. Thus, when a new single-sign-on standard is published, support for this standard is easily added.

Traditional user authentication involves interaction between an enterprise's computing environment and the end-user only; the manner in which the enterprise chooses to implement this authentication interchange is the choice of the enterprise, which has no impact on any other enterprise. When federation or cross-domain single-sign-on functionality is desired to be supported, however, it becomes a requirement that enterprise partners interact with each other. This requirement cannot be done scalably using proprietary protocols. Although adding support for standards-based federation protocols directly to a point-of-contact entity seems like a robust solution, the point-of-contact entity, which is already an existing component within the enterprise's computing environment, must be modified; moreover, it must be modified every time that one of these public federation protocols changes. Moving this functionality out of the point-of-contact entity provides a more modular approach, wherein this pluggable functionality makes it easy to maintain migrations or updates to these protocols.

Distributed Retrieval of Data Objects Using Tagged Artifacts within Federated Protocol Operations As noted further above, there is a tradeoff that should be considered in the implementation of federated protocol operations. Some operations, such as those that might require minimal interaction with the user to complete an operation, should be performed in a manner that is minimally burdensome on the user, but they should also be performed in a manner that is efficient for the federated enterprises, particularly for those types of operations that might be required across all users within an enterprise. With respect to operations that are required in order to support certain federated protocols, a federated enterprise may not have much flexibility in the manner in which those operations are implemented and the resulting burdens on the users and on the federated enterprise's computational resources. A federated enterprise may be required to perform certain actions in certain ways in accordance with federation specifications to which the federated enterprise has agreed. In other words, a federated enterprise may be required by business contracts to implement certain federation operations without regard to the computational burden of those operations.

However, many aspects of functionality within a federated environment could be categorized as operations that support one or more business goals that are desired by one or more enterprises within a federation yet are not necessarily required to support federation protocols or that are not necessarily required in order to participate within a federation. Since the resulting actions for supporting an enterprise-specific business goal may have ramifications across a federated environment, the manner in which the supporting operations are implemented should be accomplished in a manner that is scalable across thousands or millions of users within a federation. A system administrator with responsibilities of managing federated functionality within an enterprise should be able to configure its computational resources in an efficient manner when implementing the desired business goals of the enterprise.

As noted above, one manner of addressing the burden on computational resources within a federated enterprise is to implement the federated functionality within a distributed data processing system. For example, the services of an identity provider could be supported within a distributed data processing system. However, the characteristics of a distributed data processing system may be problematic; some of the requirements of federated protocols would complicate the implementation of the functionality for performing those federated protocols within a distributed data processing system.

More specifically, federated entities, such as identity providers, generate data objects within a federation. In accordance with the specifications of some federated protocols, these data objects are transferred between federated entities via the use of artifacts, which are described in more detail further below. The referential relationship between an artifact and its associated data object must be maintained in any federated computational environment without regard to the implemented infrastructure of the federated computational environment. To that end, the present invention provides a distributed computational infrastructure for efficient management of federated protocol operations, particularly with respect to distributed retrieval of artifact-referenced data objects. Prior to discussing additional details of the present invention, though, the complications that may be introduced by a distributed data processing with respect to distributed retrieval are discussed in more detail in order to better distinguish the manner in which the present invention addresses these problems.

Both SAML and Liberty Alliance Browser/Artifact profiles have two primary steps for information retrieval from an identity provider to a service provider as part of establishing a single-sign-on session. In the first step, the identity provider sends an artifact to the service provider. In general, an artifact is a size-limited element that acts as a reference pointer to a data object. It should be noted that the artifact-referenced data object may be a data object of any type. Hence, the data object may contain structured data, i.e. data along with meta-data or formatting information. The data object may or may not be formatted; it may be formatted, but not necessarily, in accordance with federated protocols. Alternatively, the data object may be a message, a portion of a message, or an attachment to a message. Continuing with the example, an identity provider can send the artifact to the service provider over an HTTP redirect via an end-user's browser; in this example, the artifact-referenced data object may be a security-related assertion. Because of the small size of the artifact, it does not generally cause a URL to exceed the size limitations of a query string. In the second step, the service provider, on receiving this artifact, will then implement a direct SOAP/HTTP request to the identity provider to retrieve the appropriate assertion based on the artifact.

These protocols/profiles implicitly require that all of the retrievals are done against a single cache that contains the artifact-referenced data objects; there is no accommodation of a distributed cache or a distributed environment. As an example of a typical distributed environment, an identity provider may have multiple data centers that are geographically distributed across a country. At some point in time, a user initially attempts to access the resources of an identity provider: by logging into the identity provider; by requesting a public resource or a private resource at the identity provider; by attempting to access an identity provider single-sign-on URL based on a redirection from a service provider; or by some other operation with respect to a federated partner. When a user first attempts to access the identity provider's resources, a load balancer assigns the user to a particular data center. Typically this is done based on some combination of geographic proximity and usage and may involve various allocation techniques, such as a round-robin algorithm or a least-recently-used algorithm. The load balancer then establishes some means of ensuring that the user sticks to this data center for the duration of the user's session. Stickiness is most commonly based on an HTTP cookie, the user's IP address, an SSL session ID, or some other means that is bound to the user and the user's HTTP session.

When this type of distributed environment is used, however, the federated entity is attempting to retrieve the data object that is bound to the received artifact by means of a direct channel (i.e., a request that does not leverage HTTP redirection); the federated entity, e.g., a service provider, has no means of acquiring or inheriting the characteristics of the user's session, sometimes referred to as the user's stickiness. Therefore, the federated entity has no guarantee that the data object retrieval request will be sent to the data center that has actually generated the original artifact and cached the associated mapping between the artifact and the artifact-referenced data object.

The present invention provides a distributed computational infrastructure for efficient management of federated protocol operations, particularly with respect to distributed retrieval of artifact-referenced data objects, as discussed further below and as illustrated in the remaining figures. The present invention extends artifact-based retrieval functionality to allow for retrieval of an artifact-referenced data object in a type of proxied manner. The present invention allows a federated entity, such as a service provider, to be directed to the appropriate data processing system or data center while allowing load factoring and yet still retrieve the artifact-referenced data object from the data processing system or the data center that generated the artifact. The approach of the present invention negates the need for cache reconciliation or other techniques for maintaining a global, distributed cache.

Figure 8:
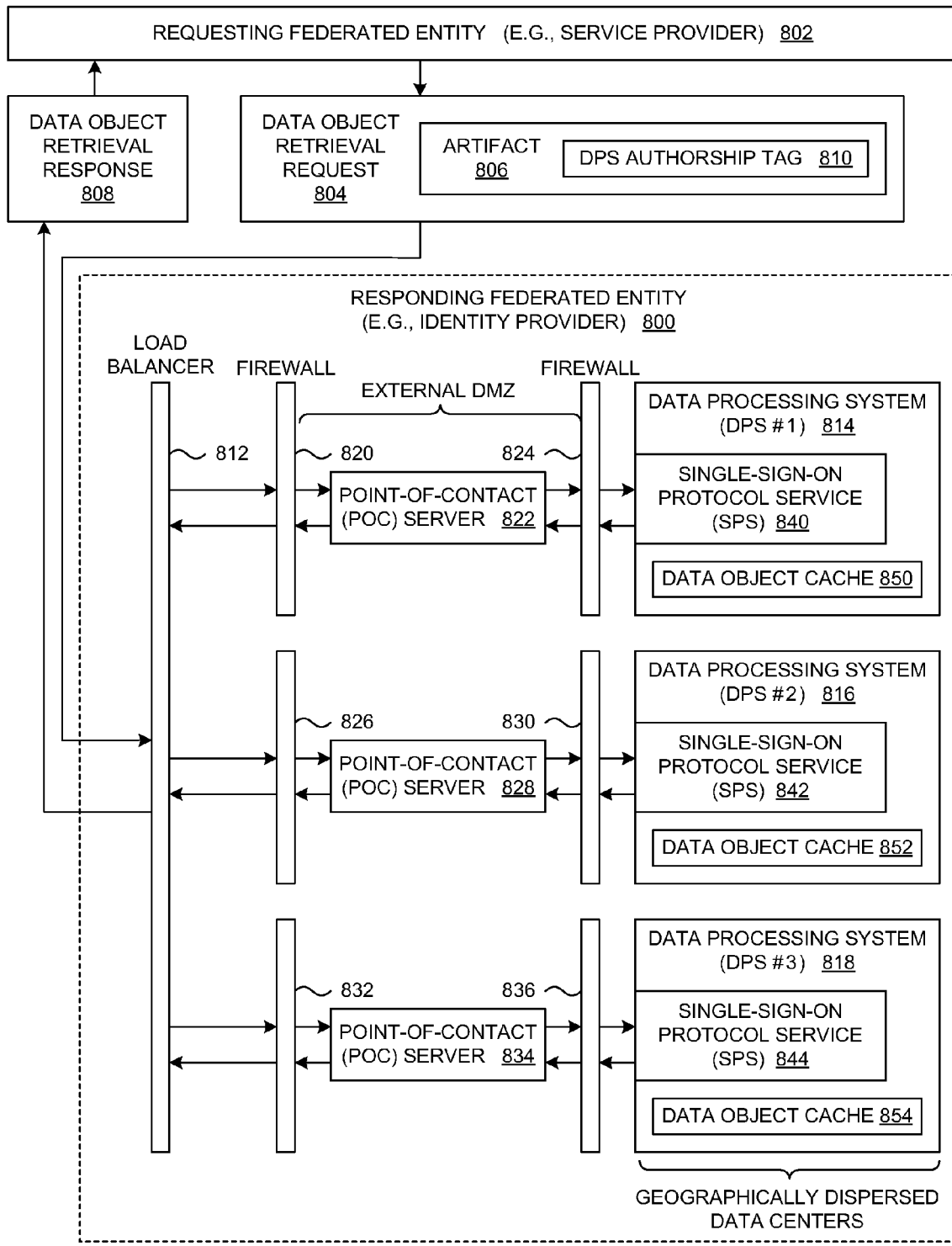
FIG. 8 depicts a block diagram that shows a federated entity that is implemented as a distributed data processing system to support distributed retrieval of artifact-referenced data objects.

With reference now to FIG. 8, a block diagram depicts a federated entity that is implemented as a distributed data processing system to support distributed retrieval of artifact-referenced data objects in accordance with an embodiment of the present invention. FIG. 8 shows a pair of federated entities within a federated computational environment. In general, federated entity 800 generates data objects on behalf of or for another federated entity, such as federated entity 802. Federated entity 800 may represent an identity provider, a service provider, or some other type of federated entity, depending upon the type of federated operation that is occurring. Likewise, federated entity 802 may represent an identity provider, a service provider, or some other type of federated entity, depending upon the type of federated operation that is occurring.

As requested or required, federated entity 800 generates a data object and an associated artifact; the artifact references the data object, and the data object can be termed an artifact-referenced data object. After a data object as been generated and stored by federated entity 800, an artifact can be provided to federated entity 802, which subsequently uses the artifact to retrieve the associated data object, i.e. the data object that is referenced by, i.e. mapped to, the artifact. Federated entity 802 sends data object retrieval request 804 to federated entity 800 to retrieve the previously generated data object based on artifact 806 that is contained within data object retrieval request 804. From this perspective, federated entity 802 can be viewed as the requesting federated entity 802, and federated entity 800 can be viewed as the responding federated entity 800.

After federated entity 802 sends data object retrieval request 804 to federated entity 800, federated entity 800 processes the data object retrieval request by retrieving the artifact-referenced data object and returning data object retrieval response 808 to federated entity 802. Data object retrieval response 808 contains the appropriate data object that is associated with artifact 806. Federated entity 800 deletes the provided data object from a datastore upon providing the data object to federated entity 802, thus ensuring that this artifact-data object pair exhibits "one-time-use" characteristics.

The transfer of a data object in this manner between federated entity 800 and federated entity 802 may be performed in accordance with various standard or proprietary protocols. For example, data object retrieval request message 804 and data object retrieval response message 808 may be formatted in accordance with standardized specifications. However, in accordance with a novel aspect of the present invention, an alternative embodiment of the present invention may employ data processing system authorship tag 810 within artifact 806, which is explained in more detail further below.

Turning now to discuss more important novel aspects of the present invention, FIG. 8 also illustrates an embodiment of a federated entity in accordance with the present invention in which the federated entity is organized as a distributed data processing system that supports distributed retrieval of artifact-referenced data objects. In order to distribute the processing load, federated entity 800 employs load balancer 812, which receives and forwards incoming request messages, such as data object retrieval requests, amongst multiple data processing systems, such as data processing system 814, data processing system 816, and data processing system 818. Load balancer 812 may employ various well-known algorithms to distributed the workload amongst multiple data processing systems, including geographic distribution, e.g., in which the requests from a user in a given region are directed to a data center within the same geographic region.

Data traffic to/from the multiple data processing system passes through firewalls and point-of-contact servers in a manner that is similar to what is shown in FIG. 7. Data traffic for data processing system 814 passes through firewall 820, point-of-contact server 822, and firewall 824. Data traffic for data processing system 816 passes through firewall 826, point-of-contact server 828, and firewall 830. Data traffic for data processing system 818 passes through firewall 832, point-of-contact server 834, and firewall 836. In one embodiment of the present invention, data processing systems 814-818 and their associated infrastructures may represent geographically dispersed data centers, thereby allowing load balancer 812 to distribute the data traffic and the associated processing load amongst data processing systems 814-818 in a manner that is geographically appropriate for the origination of resource requests and the location of data processing systems 814-818. In the case of geographically distributed data centers, firewall 826, point-of-contact server 828, and firewall 830 may in turn be representative of a set of machines that have been replicated to ensure high levels of availability within the data center.

Although not shown in detail in FIG. 8, data processing systems 814-818 contain functionality for handling federated protocol operations/profiles that have been discussed above with respect to other figures, e.g., as represented by federation front-end 340 in FIG. 3 and by components behind firewall 712 in FIG. 7. For example, each of data processing systems 814-818 contain single-sign-on protocol service (SPS) components that are similar to SPS 354 in FIG. 3 and SPS 716 in FIG. 7. More specifically, data processing systems 814, 816, and 818 contain SPS components 840, 842, and 844, respectively.

In addition, data processing systems 814, 816, and 818 contain data object caches 850, 852, and 854, respectively. Each data processing system stores its artifact-referenced data objects within its data object cache until a data object is retrieved using its associated artifact. Using the exemplary components as shown in FIG. 8, an illustrative embodiment of the present invention employs a distributed architecture for a federated entity, thereby allowing the federated entity to support distributed retrieval of artifact-referenced data objects from caches 850-854. It should be noted that if data processing system 818 in turn has data-center-based load balancing, then cache 854 can be shared by any replicated SPSs within a data center; otherwise, within a given data center, any necessary data replication across intra-data-center caches can be implemented.

While the present invention is applicable to generalized data objects, some exemplary processes for using the present invention to support distributed retrieval of artifact-referenced assertions are discussed in more detail hereinbelow; in other words, an example is discussed in which the artifact-referenced data object is represented by an assertion. In particular, using the exemplary architecture that is shown in FIG. 8, an SSO Protocol Service (SPS) component provides the end points that are exposed for Liberty/SAML functionality, including assertion retrieval. When an artifact-based request is received, the SPS component will use the artifact to index into a datastore of assertions, e.g., a hash table or a cache, retrieve the appropriate assertion, and respond to the received request. In the present invention, if an assertion is not found in a local datastore, then instead of returning an error, the SPS component will attempt to request the appropriate assertion from the other data centers of the identity provider, as described hereinbelow.

More specifically, in an exemplary implementation of the present invention, federated entity 800 may be an identity provider or, more generally, an issuing party; federated entity 802 may be a service provider or, more generally, a relying party. As requested or required, federated entity 800 issues assertions, e.g., SAML assertions, which were discussed hereinabove. Federated entity 802 employs those assertions for various federated protocol operations/profiles in accordance with one or more specifications for different federated computational environments, e.g., to accomplish a federated single-sign-on authentication operation; in any case, the artifact-referenced data object may be a security assertion. Federated entity 800 issues artifacts, each of which is associated with an assertion. Although assertions may be issued without the generation of an associated artifact, an artifact may be issued when an assertion is issued; the issuance of an artifact occurs as required by the federated protocol operation/profile that has caused the assertion to be issued. An artifact references an assertion; a mapping between the assertion and the artifact is temporarily maintained until the assertion itself is retrieved. After an assertion has been issued and stored by federated entity 800, an artifact can be provided to federated entity 802, which subsequently uses the artifact to retrieve the associated assertion, i.e. the assertion that is referenced by, i.e. mapped to, the artifact.

Figure 9A:
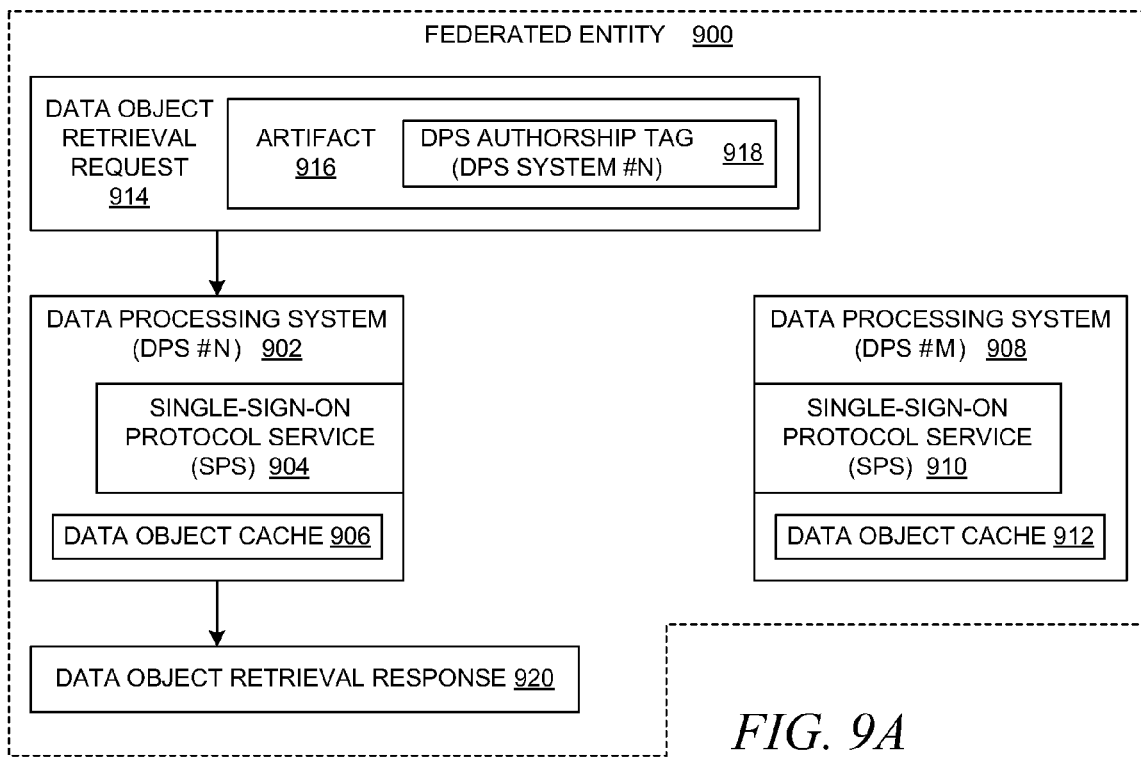
FIGS. 9A-9B depict block diagrams that show scenarios in which a federated entity that is implemented as a distributed computational system having multiple data processing systems supports retrieval of artifact-referenced data objects using authorship tags within artifacts.
Figure 9B:
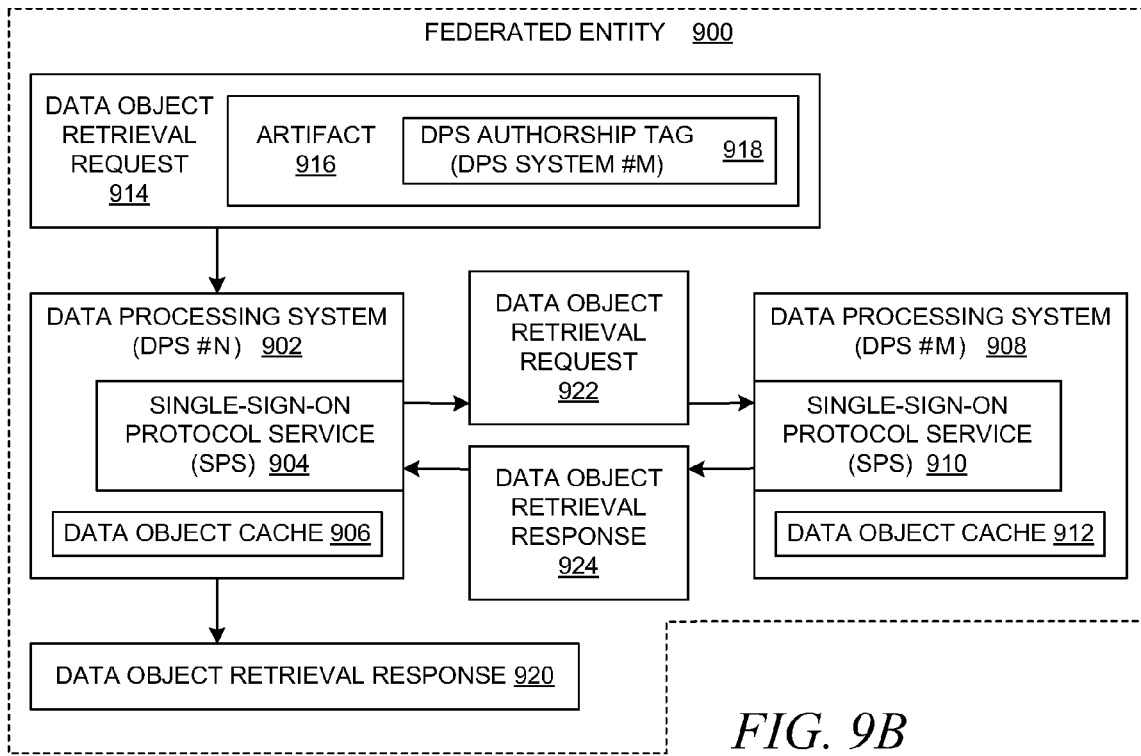
Figure 9C:
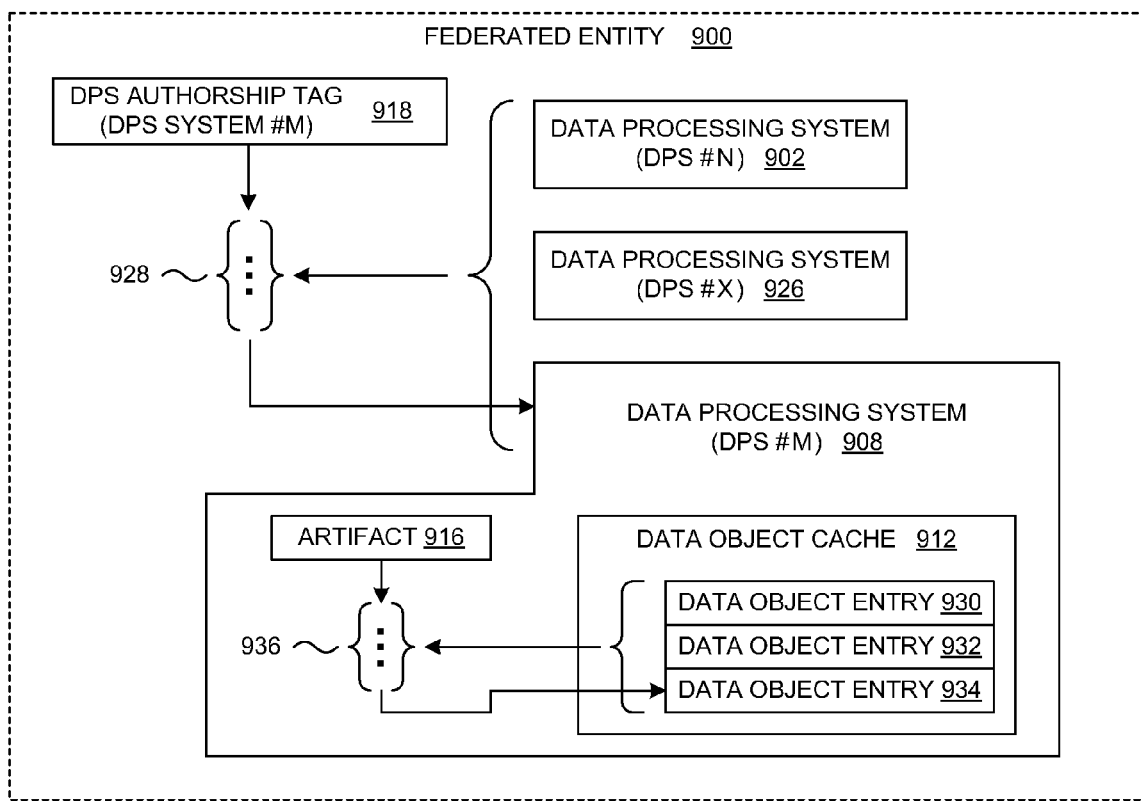
FIG. 9C depicts a block diagram that shows the use of a DPS authorship tag to reference a data processing system within a distributed federated entity in combination with the use of an artifact to reference a mapping between the artifact and its associated data object.

A more detailed example of the manner in which the present invention may be employed to support distributed retrieval of an artifact-referenced data object using tagged artifacts is shown in FIGS. 9A-9C.

With reference now to FIGS. 9A-9B, block diagrams depict scenarios in which a federated entity that is implemented as a distributed computational system having multiple data processing systems supports retrieval of artifact-referenced data objects using authorship tags within artifacts in accordance with an embodiment of the present invention. FIGS. 9A-9B depicts some elements of a federated entity, such as an identity provider, in a manner that is similar to the elements of a federated entity that are shown in FIG. 8.

Referring now to FIG. 9A, federated entity 900 is a distributed data processing system that contains multiple data processing systems, each of which may represent a data center. Data processing system 902 contains single-sign-on service (SPS) 904 and data object cache 906; data processing system 908 contains SPS 910 and data object cache 912. SPS 904 and SPS 910 may be involved when the artifact-referenced data object that is to be retrieved is an authentication assertion; alternatively, other functional elements that support federated functionality may be involved when the artifact-referenced data object that is to be retrieved is a similar or different type of data object.

At some point in time, data processing system 902 receives data object retrieval request 914. It may be assumed that data processing system 902 receives a data object retrieval request from another federated entity, such as a service provider, as described above with respect to FIG. 8. However, it should be noted that data object retrieval request 914 may or may not have passed through a load balancer, a firewall, or other functional elements as shown in FIG. 8.

Data object retrieval request 914 includes artifact 916 that was issued by a data processing system within federated entity 900. As described above, an artifact is a size-limited element that acts as a reference pointer to a data object. The data processing system that generated the original data object had also cached an associative mapping between the data object and its artifact; in this manner, an artifact or portion thereof may be used as a search key to find the mapping, thereby locating the cached data object.

The present invention supports a novel optimization: DPS authorship tags within artifacts. In the example that is shown in FIG. 9A, artifact 916 contains data processing system (DPS) authorship tag 918.

A DPS authorship tag is generated or issued by the data processing system (DPS) that creates the data object and its associated artifact. In this manner, the DPS authorship tag indicates the data processing system that authored or generated the artifact, and therefore the associated data object. A DPS authorship tag may contain an identifier for the authoring data processing system; alternatively, the DPS authorship tag may contain a coded indicating value that can be mapped or used to lookup the identity or the location of the appropriate data processing system that authored/generated/issued the DPS authorship tag, and therefore, the artifact and the artifact-referenced data object. When a particular authoring data processing system receives a data object retrieval request that contains a tag that indicates or identifies that particular data processing system, then that particular data processing system is able to immediately satisfy the data object retrieval request because it has authored the tag; in other words, that particular data processing system has stored a mapping between the data object and the data object's associated artifact in its local data object cache.

A data processing system within a distributed federated entity employs an artifact to query its data object cache for the artifact-referenced data object. Before the appropriate data object cache can be searched, though, the data object retrieval request must be received at the appropriate data processing system. The DPS authorship tag of the present invention supports the flexible functionality in which a data processing system within the distributed federated entity does not immediately assume that it is the data processing system that has authored/issued/generated an artifact and its associated data object. For example, a load balancer within the federated entity's distributed computational environment may forward the data object retrieval request to any selected data processing system, and the selected data processing system does not assume that the receipt of a data object retrieval request necessarily means that the selected data processing system has authored the requested data object. Instead, the selected data processing system employs the DPS authorship tag to proxy the data object retrieval request to the identified or indicated data processing system, if necessary. After the data object retrieval request has been received by the appropriate data processing system, then the data processing system can employ the artifact to search for its associated data object.

Referring again to FIG. 9A, artifact 916 is extracted from data object retrieval request 914. Before searching its local data object cache 906 or similar datastore for a mapping between a copy of artifact 916 and its associated data object, data processing system 902 extracts DPS authorship tag 918 from artifact 916. In the example that is shown in FIG. 9A, DPS authorship tag 918 happens to indicate data processing system 902. Hence, data processing system 902 will search its local data object cache 906 using the artifact that it has previously extracted from the received data object retrieval request; the artifact may be used as a search key or as the basis for a search key. Assuming that data processing system 902 finds the artifact-referenced data object within data object cache 906, data processing system 902 generates data object retrieval response 920 with the appropriate data object to be returned to the requesting federated entity, e.g., a service provider.

Referring now to FIG. 9B, DPS authorship tag 918 indicates that a different data processing system has authored or created the artifact. Hence, if attempted, data processing system 902 would fail in any attempt to locate the requested artifact within its local datastore or cache. In the optimization that is provided by the present invention, if the DPS authorship tag indicates that the requested artifact will not be found in the local datastore, then instead of returning an error, data processing system 902 will send or forward the request to the data processing system that is identified or indicated by DPS authorship tag 918. In the example that is shown in FIG. 9B, SPS 904 will issue a data object retrieval request to the identified data processing system within the federated entity, e.g., by sending data object retrieval request 922 to SPS 910 at data processing system 908; data object retrieval request 922 contains the requested artifact and may be similar to data object retrieval request 914, which may be modified to indicate that data processing system 902 is the sender of data object retrieval request 922.

Data processing system 908 is able to fulfill the received request because it was the originator of the artifact/data object pairing, and it has stored a mapping between the requested artifact and its associated data object. Data processing system 908 retrieves the data object from local data object cache 912, preferably removes it from local datastore 912 so that it cannot be reused, and returns the data object to data processing system 902 within data object retrieval response 924. Federated entity 900 then fulfills the original data object retrieval request that was received from the requesting federated entity, e.g., a service provider, when data processing system 902 sends a data object retrieval response to the requesting federated entity. It should be noted that if the artifact/data object had previously been rendered unusable, then data processing system 908 provides this information to data processing system 902, who in turn builds the appropriate error response to return to the requesting federated entity. A pairing of an artifact and its associated data object may become unusable because a data object had already been retrieved or because it had become stale when a timestamp that was associated with the lifetime of the data object had expired.

With reference now to FIG. 9C, a block diagram depicts the use of a DPS authorship tag to reference a data processing system within a distributed federated entity in combination with the use of an artifact to reference a mapping between the artifact and its associated data object in accordance with the present invention. Data processing system 902, data processing system 908, and data processing system 926 support distributed data object retrieval functionality within federated entity 900. DPS authorship tag 918 identifies or otherwise indicates a particular data processing system in set 928 of data processing systems within distributed federated entity 902. Any given data processing system within distributed federated entity 902 may employ DPS authorship tag 918 to determine the appropriate destination of an incoming data object retrieval request because the target data processing system is a member of set 928, which is known to each data processing system within set 928.

Data processing system 908 maintains data object cache 912, which contains data object entries 930-934; each data object entry may be viewed as a member of set 936 of data object entries. Each data object entry may contain a copy of an artifact along with the data object that is associated with the artifact, thereby forming a mapping between the two data items. Hence, artifact 916 identifies or otherwise indicates a particular data object entry in set 936 of data object entries within data object cache 912. Data processing system 908 employs artifact 916 to determine its associated data object by searching through set 936 of data object entries.

Figure 10:
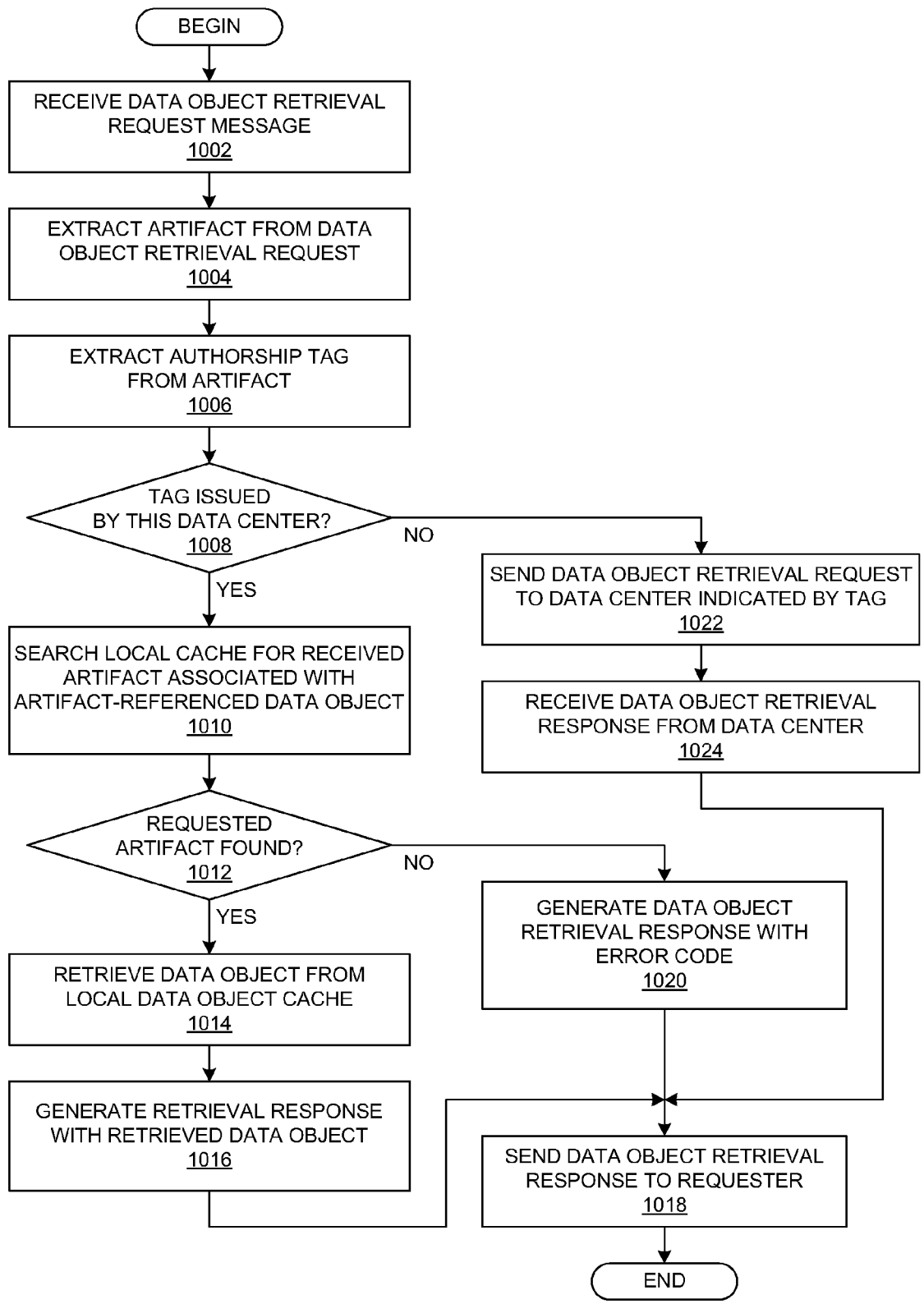
FIG. 10 depicts a flowchart that shows a process within a distributed identity provider that is implemented using multiple data processing systems that support distributed assertion retrieval using authorship tags within artifacts associated with assertions.

With reference now to FIG. 10, a flowchart depicts a process within a distributed federated entity that is implemented using multiple data processing systems that support distributed data object retrieval using authorship tags within artifacts associated with data objects in accordance with an embodiment of the present invention. The process commences when one of a plurality of data centers or data processing systems that comprise a distributed federated entity receives a data object retrieval request message (step 1002). If this message is received from an entity that is external to the federated entity, such as a service provider, then this message can be distinguished from subsequently employed data object retrieval request messages within the same transaction by referring to it as the original data object retrieval request message. The data center that has received the data object retrieval request message then extracts an artifact from within the message (step 1004).

A DPS authorship tag is then extracted from the artifact (step 1006). In the normal course of processing these authorship tags, i.e. if no errors occur or have occurred, then the DPS authorship tag has been issued, authored, or otherwise generated by one of a plurality of data centers or data processing systems that comprise the federated entity, possibly by the current data processing system, i.e. the data processing system that is currently processing the data object retrieval request message. However, the data object retrieval request message may be assumed to be equally likely to be received by any one of a plurality of data centers or data processing systems that comprise the federated entity. For example, a load balancer for the federated entity may distribute the incoming data object retrieval request messages without regard or knowledge of the data processing system that originally issued the artifact. Hence, a determination is made as to whether or not the current data processing system has issued the authorship tag (step 1008).

If the current data processing system has issued the authorship tag, then the current data processing system continues to process the artifact. A local data object cache or other datastore is searched for the artifact (step 1010), thereby also searching for the data object that is associated with the received artifact, e.g., by using the artifact or a portion thereof as a search key. A determination is made as to whether or not the requested artifact is found in a local datastore (step 1012).

If the artifact is found, then the artifact-referenced data object is retrieved from the local datastore (step 1014). After a copy of the associated data object is retrieved, the cached copy of the associated data object may be deleted to ensure that it is not re-used or otherwise maliciously used, thereby enforcing a one-time-use restriction on the data object. Alternatively, the cached copy of the associated data object may be maintained; whether or not the cached data object is deleted depends upon the needs of the federated entity and/or the services that are provided by the federated entity.

The data center then generates a data object retrieval response message with the data object that has been found (step 1016). The data center sends the data object retrieval response message to the requesting federated entity (step 1018), e.g., a requesting service provider, thereby concluding the process.

If the data object was not successfully found nor retrieved at step 1012, then the data processing system generates a data object retrieval response message that contains an error code to indicate the failure to locate the requested data object (step 1020). The data center then sends the data object retrieval response message to the requesting federated entity at step 1018, thereby concluding the process.

If it is determined at step 1008 that the current data processing system has not issued the authorship tag, then the authorship tag indicates the data processing system that did issue the artifact. The current data processing system does not continue to process the artifact, and an attempt is made to retrieve the data object from the appropriate data processing system within the federated entity. The current data processing system sends a data object retrieval request message to the appropriate data processing system within the federated entity as indicated by the authorship tag (step 1022); the data object retrieval request message may be a modified version or a forwarded copy of the originally received data object retrieval request message. The data processing system that is indicated by the authorship tag will receive the data object retrieval request message from the current data processing system and attempt to process the received message using steps that are similar to steps 1002-1020.

At some subsequent point in time, the current data processing system receives a data object retrieval response message from the data processing system to which it sent the data object retrieval request message (step 1024). If the data object was successfully retrieved from the other data processing system, then the data object retrieval response message contains the appropriate data object and may also contain a successful response code. If the data object was not successfully retrieved, then the data object retrieval response message would contain an error code to indicate the failure to locate the requested data object. In either case, the data center sends a data object retrieval response message to the requesting federated entity at step 1018, thereby concluding the process.

CONCLUSION

The advantages of the present invention should be apparent in view of the detailed description of the invention that is provided above.

The present invention supports the implementation of federated entities as distributed data processing systems. The distributed data processing system is composed of multiple data processing systems, each of which is able to issue artifacts for associated data objects and to respond to artifact-based retrieval requests while also having proxying functionality for artifact-based retrieval requests.

The present invention is advantageous because it supports a distributed data center environment that is required for large enterprises that may support millions of customers yet in which certain prior art data management techniques are not possible. In addition, the present invention does not require advanced data management techniques that would be required by distributed caches. Moreover, using the present invention, a requesting federated entity, such as a service provider, need not be aware of the distributed nature nor existence of the multiple data centers that provide the functionality for the responding federated entity, such as an identity provider.

More specifically, the present invention supports various requirements of different federation specifications; in other words, the present invention is compatible with various federated protocols as promulgated in different specifications for standardized federation environments. Hence, the present invention is not only compatible with various federated protocols but also concurrently supports multiple federated protocols, and the present invention supports this functionality within distributed environments.

The ability of the present invention to support multiple federated protocols within a distributed computing environment is importantly advantageous in view of typical prior art solutions for federated environments. In a typical prior art federated environment, a set of actions in an Internet environment are accomplished with a single protocol, whether all HTML/HTTP, all SOAP/MQ, and so on. In some cases, however, functionality has been defined that mixes protocols, such as SAML and Liberty Alliance ID-FF protocols. Both SAML 2.0 and Liberty Alliance profiles allow for both HTTP-redirect and SOAP-HTTP profiles for "Register Name Identifier" (RNI) and "Federation Termination Notification" (FTN), even though an end user's experience and interaction with providers in these environments is based on HTTP. The HTTP-redirect-based profiles are easily "bound" to a user as the user's browser and session is used as part of the triggering and transmission of these protocol flows. In addition, Liberty Alliance ID-WSF allows for SOAP-based protocols to retrieve information about a user outside of the binding of the user's HTTP session and runtime. These SOAP profiles do not involve the end user (or an agent acting on their behalf) as they are defined to be direct communications between two providers, e.g., an identity provider and a service provider. Thus the SOAP profiles are not easily bound to a user or a user's runtime experiences. This can be problematic when considering a SOAP protocol that must act on or have knowledge of a user's runtime environment.

In a typical distributed environment, local instances of a runtime will go against local copies of a distributed datastore but will maintain local copies of the runtime data, i.e. runtime data is not necessarily replicated across the distributed instances. In many cases of a federated computational environment, though, there is no means of accommodating a distributed cache nor a distributed computing environment that would allow all of the data centers within the distributed computing environment to have information about a user's session nor allow any one data center to respond to a federated request on behalf of all of the data centers. These restrictions may occur because of technical reasons, performance reasons, or policy reasons. This scenario is described hereinbelow with respect to a typical, prior art, distributed environment and then further described with respect to a typical, prior art, federated distributed environment.

In a typical, prior art, distributed environment, the distributed environment is configured with multiple data centers. User requests are routed to data centers based on usage, proximity, and prior assignment to a data center. For example, when an initial HTTP request is received, a load balancer may determine that the user's requests will be routed to a particular data center based on a selection algorithm, e.g., geographical proximity to the user, least load, least recently used, etc. The load balancer will set up some form of "stickiness" to ensure that all of the user's subsequent requests are routed to that data center. This stickiness is based on some type of data that is associated with the user, or more importantly, the agent acting on behalf of the user, e.g., an HTTP browser application. Sticky data is most commonly based on an HTTP cookie, the user's IP address, an SSL session id, or some other means that is bound to the user and the user's HTTP session.

In some cases, a request does not originate with the user or the user's agent application; instead, a request for information about a user is generated on a user's behalf from another entity which does not have knowledge of the sticky data. When a request is received at the load balancer without the sticky data, it will not be bound to the user's previous requests, so there is no guarantee that it will be routed to the data center that is serving the user's requests, i.e. the data center that is managing the user's session. Therefore, requests like machine-to-machine SOAP/HTTP requests are not bound to a user and have no way of being easily associated with a user by the load balancer.

With respect to a typical, prior art, federated distributed environment, an identity provider may have multiple data centers that are geographically distributed across a country, e.g., West Coast, Southwest, Mid-West, East Coast, New England, etc. In an exemplary scenario, a user might initially attempt to access an identity provider's resources; the user might be attempting to access one of many resources at the identity provider, e.g., a login request, a request for a public/private resource, or an attempt to access an identity provider's SSO URL based on redirection from a service provider. A load balancer for the identity provider will assign the user to a particular data center within the identity provider's distributed computational environment. The load balancer will then establish some means of "sticking" the user to this data center for the duration of their session.

A user may have a session bound to one of the data centers of an identity provider, but a service provider has no way of knowing this (or even knowing that there are multiple data centers within the identity provider's computing environment). When a user interacts with a service provider, it is using the same agent, e.g., a browser application, as was used to interact with the identity provider. When the service provider needs to retrieve information about the user from the identity provider, there are two basic means of doing this: by invoking an indirect channel to the identity provider that involves the user's browser, or by a direct invocation of a requested resource at the identity provider. In the first case, invoking the user's browser/channel, e.g., by using HTTP-redirection, will allow the user's stickiness data, e.g., HTTP cookie, to be sent to the identity provider's load balancer with the request, so that the load balancer can correctly route the request to the identity provider's data center that has all the appropriate information about the user (static as well as runtime).

However, in the second case, when the service provider directly invokes a resource at the identity on behalf of the user, the user and the user's browser/agent are not involved in the request, and the request is thus received at the load balancer without any sticky data to route the request to the appropriate data center. The load balancer may then proceed to route the request to a data center that is chosen at that point in time. If the request is received at the data center that has current runtime data about the user, then the data center may successfully fulfill the request. If the request is received at a data center that does not have current runtime data about the user, then the data center does not have the means of fulfilling the request; this result is common in a distributed environment in which distributed caches/runtimes are not possible (if only for the performance overhead required to maintain all the required runtime data in real time).

Thus when a service provider sends a request to one of a set of distributed data centers within a federated computing environment, if this request is sent to the data center using a "direct" means (e.g., SOAP/HTTP between the service provider and a data center), there is no way for the load balancing/routing functionality to determine to which user the request is bound and thus to which data center the request should be routed. Thus, a data center may receive a request that concerns a user about whom the data center has no knowledge and thus no way to fulfill the request.

The present invention allows a distributed federated data center to proxy this request to other data centers in the hopes of finding a data center that has the runtime information that is required to fulfill the request. The optimization of the present invention reduces the need to do a search of multiple data centers by assigning an identifier or tag value to each data center. When a data center generates an artifact, the data center appends/embeds its tag value/identifier to/within the artifact. For example, the data center may append its tag to the succinct ProviderID field that is included with a browser artifact. Since this artifact is not used by a service provider, there are no interoperability requirements on this tag value. This approach allows all of the data centers to continue to be identified as a single SuccinctProviderID, which is a Liberty Alliance requirement, i.e. as belonging to a single identity provider, and yet each data center within the identity provider can be specifically identified based on its tag value.

With respect to retrieving an artifact-referenced data object by a data center from another data center, the tag value may be used to retrieve an artifact-referenced data object directly from the appropriate data center without performing a search amongst multiple data centers.

For example, if a data center does not correspond to the SuccinctProviderID_tag that is received in a SAML assertion retrieval request message, then the correct data center will be determined based on the tag value. The request for the SAML assertion would be re-issued to the appropriate data center based on the tag value; a data center could send the data object retrieval request message directly to the appropriate data center without initiating a search across other data centers. It should be noted that this approach does not represent a replay as disallowed by certain specifications because technically a replay implies that a data center has received and fulfilled a SAML assertion retrieval request and then receives the same request a second time.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable storage media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for transferring data objects between federated entities in a federated computational environment, the computer-implemented method comprising:

receiving a data object retrieval request from a first federated entity at a second federated entity, wherein the second federated entity issues artifacts for the first federated entity in accordance with a trust relationship between the second federated entity and the first federated entity, wherein services of the second federated entity are provided by a set of data processing systems within a distributed data processing system, and wherein each data processing system in the set of data processing systems generates artifacts;

extracting an artifact from the data object retrieval request by a first data processing system in the set of data processing systems, wherein the artifact references a data object that is stored by the second federated entity;

extracting a tag from the artifact, wherein each data processing system in the set of data processing systems is uniquely identifiable, wherein each artifact includes a tag, and wherein each tag has a value that indicates a data processing system within the set of data processing systems that generated a tag; and employing the extracted tag to identify a data processing system within the set of data processing systems as having generated the artifact, the employing step determining that the extracted tag identifies a second data processing system as having generated the artifact;

sending a retrieval request from the first data processing system to the second data processing system, wherein the retrieval request contains the artifact;

receiving the retrieval request from the first data processing system at the second data processing system;

searching a local datastore of the second data processing system using the artifact;

retrieving the data object that is referenced by the artifact;

sending a retrieval response from the second data processing system to the first data processing system, wherein the retrieval response contains the data object;

receiving a retrieval response from the second data processing system at the first data processing system; and returning a data object retrieval response including the data object from the first data processing system to the first federated entity.

2. The method of claim 1 further comprising:
determining that the extracted tag identifies a third data processing system as having generated the artifact;
searching a local datastore of the third data processing system using the artifact;
retrieving the data object that is referenced by the artifact.

3. The method of claim 1 further comprising:
deleting the data object from the local datastore.

4. The method of claim 1 wherein the first federated entity is a service provider and the second federated entity is an identity provider.

5. The method of claim 1 wherein the first federated entity is an identity provider and the second federated entity is a service provider.

6. The method of claim 1 wherein the first federated entity is an issuing party and the second federated entity is a relying party.

7. The method of claim 1 wherein the first federated entity is a relying party and the second federated entity is an issuing party.

8. The method of claim 1 wherein the data object is an assertion.

9. The method of claim 1 wherein the data object is a security assertion.

10. The method of claim 1 wherein the data object is retrieved during an authentication operation.

11. A computer program product on a computer readable storage medium for transferring data objects between federated entities in a federated computational environment, the computer program product comprising:

instructions for receiving a data object retrieval request from a first federated entity at a second federated entity, wherein the second federated entity issues artifacts for the first federated entity in accordance with a trust relationship between the second federated entity and the first federated entity, wherein services of the second federated entity are provided by a set of data processing systems within a distributed data processing system, and wherein each data processing system in the set of data processing systems generates artifacts;

instructions for extracting an artifact from the data object retrieval request by a first data processing system in the set of data processing systems, wherein the artifact references a data object that is stored by the second federated entity;

instructions for extracting a tag from the artifact, wherein each data processing system in the set of data processing systems is uniquely identifiable, wherein each artifact includes a tag, and wherein each tag has a value that indicates a data processing system within the set of data processing systems that generated a tag; and instructions for employing the extracted tag to identify a data processing system within the set of data processing systems as having generated the artifact, the instructions for employing including instructions for determining that the extracted tag identifies a second data processing system as having generated the artifact;

instructions for sending a retrieval request from the first data processing system to the second data processing system, wherein the retrieval request contains the artifact;

instructions for receiving the retrieval request from the first data processing system at the second data processing system;

instructions for searching a local datastore of the second data processing system using the artifact;

instructions for retrieving the data object that is referenced by the artifact;

instructions for sending a retrieval response from the second data processing system to the first data processing system, wherein the retrieval response contains the data object;

instructions for receiving a retrieval response from the second data processing system at the first data processing system; and instructions for returning a data object retrieval response including the data object from the first data processing system to the first federated entity.

12. The computer program product of claim 11 further comprising:

instructions for determining that the extracted tag identifies a third data processing system as having generated the artifact;

instructions for searching a local datastore of the third data processing system using the artifact;

instructions for retrieving the data object that is referenced by the artifact.

13. The computer program product of claim 11 wherein the first federated entity is a service provider and the second federated entity is an identity provider.

14. The computer program product of claim 11 wherein the first federated entity is an identity provider and the second federated entity is a service provider.

15. The computer program product of claim 11 wherein the first federated entity is a relying party and the second federated entity is an issuing party.

16. The computer program product of claim 11 wherein the data object is a security assertion.

17. The computer program product of claim 11 wherein the data object is retrieved during an authentication operation.

18. An apparatus for transferring data objects between federated entities in a federated computational environment, the apparatus comprising:

a processor;

a computer memory holding computer program instructions which when executed by the processor perform a method comprising:

receiving a data object retrieval request from a first federated entity at a second federated entity, wherein the second federated entity issues artifacts for the first federated entity in accordance with a trust relationship between the second federated entity and the first federated entity, wherein services of the second federated entity are provided by a set of data processing systems within a distributed data processing system, and wherein each data processing system in the set of data processing systems generates artifacts;

extracting an artifact from the data object retrieval request by a first data processing system in the set of data processing systems, wherein the artifact references a data object that is stored by the second federated entity;

extracting a tag from the artifact, wherein each data processing system in the set of data processing systems is uniquely identifiable, wherein each artifact includes a tag, and wherein each tag has a value that indicates a data processing system within the set of data processing systems that generated a tag; and employing the extracted tag to identify a data processing system within the set of data processing systems as having generated the artifact, the employing step determining that the extracted tag identifies a second data processing system as having generated the artifact;

sending a retrieval request from the first data processing system to the second data processing system, wherein the retrieval request contains the artifact;

receiving the retrieval request from the first data processing system at the second data processing system;

searching a local datastore of the second data processing system using the artifact;

retrieving the data object that is referenced by the artifact;

sending a retrieval response from the second data processing system to the first data processing system, wherein the retrieval response contains the data object;

receiving a retrieval response from the second data processing system at the first data processing system; and returning a data object retrieval response including the data object from the first data processing system to the first federated entity.

19. The apparatus of claim 18 wherein the method further comprises:
- determining that the extracted tag identifies a third data processing system as having generated the artifact;
- searching a local datastore of the third data processing system using the artifact;
- retrieving the data object that is referenced by the artifact.

20. The apparatus of claim 18 wherein the first federated entity is a service provider and the second federated entity is an identity provider.

21. The apparatus of claim 18 wherein the first federated entity is an identity provider and the second federated entity is a service provider.

* * * * *